(12) United States Patent
Hiraro

(10) Patent No.: US 9,180,373 B2
(45) Date of Patent: Nov. 10, 2015

(54) GAME CONTROLLING METHOD, STORAGE MEDIUM, AND GAME APPARATUS

(75) Inventor: Takashi Hiraro, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 1440 days.

(21) Appl. No.: 12/297,659

(22) PCT Filed: Apr. 13, 2007

(86) PCT No.: PCT/JP2007/058201
§ 371 (c)(1),
(2), (4) Date: Oct. 20, 2008

(87) PCT Pub. No.: WO2007/125769
PCT Pub. Date: Nov. 8, 2007

(65) Prior Publication Data
US 2011/0045893 A1  Feb. 24, 2011

(30) Foreign Application Priority Data
Apr. 27, 2006 (JP) .................. 2006-124514

(51) Int. Cl.
*G07F 17/32* (2006.01)
*A63F 9/24* (2006.01)
*A63F 13/30* (2014.01)

(52) U.S. Cl.
CPC ......... *A63F 13/12* (2013.01); *A63F 2300/1087* (2013.01); *A63F 2300/303* (2013.01); *A63F 2300/404* (2013.01); *A63F 2300/65* (2013.01); *A63F 2300/8023* (2013.01)

(58) Field of Classification Search
CPC .............................. G07F 17/32; G07F 17/3244
USPC .......................................... 463/4, 9; 273/308
See application file for complete search history.

(56) References Cited

U.S. PATENT DOCUMENTS

| 5,885,156 A | * | 3/1999 | Toyohara et al. .................. 463/1 |
| 7,128,648 B2 | * | 10/2006 | Watanabe ........................ 463/20 |
| 2003/0171142 A1 | | 9/2003 | Kaji et al. |
| 2004/0080108 A1 | * | 4/2004 | Huley ............................ 273/243 |
| 2006/0040720 A1 | * | 2/2006 | Harrison .......................... 463/9 |
| 2007/0032282 A1 | * | 2/2007 | Hamamoto ....................... 463/9 |

FOREIGN PATENT DOCUMENTS

| JP | 2002-301264 | 10/2002 |
| JP | 2006-271825 | 10/2006 |

OTHER PUBLICATIONS

"Kido Senshi Gundam 0079 Card Builder", Gekkan Arcadia The 1 issue, vol. 7, No. 1, whole No. 68, Jan. 1, 2006, pp. 10 to 13.
"Kido Senshi Gundam Renpo Vs. Zeon", Gekkan Arcadia The 11 issue, vol. 2, No. 4, whole No. 11, Apr. 1, 2001, pp. 26 to 31.
"Kido Senshi Gundam 0079 Card Builder Ver.2.00", Gekkan Arcadia The 8 issue, vol. 7, No. 8, whole No. 75, Aug. 1, 2006, pp. 096 to 101.

* cited by examiner

*Primary Examiner* — James S McClellan
*Assistant Examiner* — Syvila Weatherford
(74) *Attorney, Agent, or Firm* — IPUSA, PLLC

(57) ABSTRACT

At the beginning of a game, the re-sortie gauge 100 is displayed in the cost gauge 90 displayed on the display unit 8. This re-sortie gauge 100 is displayed in, for example, a horizontal blue bar, and indicates the reserve cost given to the player at the time with its overall length. This reserve cost is a predetermined numerical value, and is given equally to each player. Accordingly, the same reserve cost is automatically given irrespective of whether the player is experienced or a beginner. For example, if a versus game starts and the player's own unit is attacked by an opponent unit and destroyed, the display length is reduced by subtracting the cost value of the destroyed unit from the re-sortie gauge 100. While the remaining level of the re-sortie gauge 100 is being displayed, control is performed so as to cause the destroyed unit to sortie again.

11 Claims, 27 Drawing Sheets

| CATEGORY NAME | | CARD IDENTIFICATION CODE | | DATA ITEMS RELATED TO ATTRIBUTE INFORMATION |
|---|---|---|---|---|
| | | CATEGORY | CLASSIFICATION | |
| MAIN PLAY CARD | CHARACTER CARD | 0000 | 0000 | COST, HIT PROBABILITY, EVASION SUCCESS RATE, MACHINE COMPATIBILITY, ETC. |
| | | 0000 | 0001 | |
| | | 0000 | 0010 | |
| | | 0000 | 0011 | |
| SUB PLAY CARD | MACHINE CARD | 0001 | 0000 | COST, HIT POINT, DEFENSIVE POWER, TRAVELING SPEED, GEOGRAPHICAL PROPERNESS, OUTPUT CHARACTERISTICS OF ARMED WEAPON, WEAPON SUITABILITY, ETC. |
| | | 0001 | 0001 | |
| | | 0001 | 0010 | |
| | WEAPON CARD | 0010 | 0000 | COST, WEAPON ATTRIBUTE, OFFENSIVE POWER, WEAPON HIT PROBABILITY, ATTACK RANGE, DURABILITY, MACHINE COMPATIBILITY, GEOGRAPHICAL PROPERNESS, ETC. |
| | | 0010 | 0001 | |
| | | 0010 | 0010 | |
| | | 0010 | 0011 | |
| | | 0010 | 0100 | |
| | CUSTOM CARD | 0011 | 0000 | COST, CUSTOM EFFECT |
| | | 0011 | 0001 | |

| CATEGORY NAME | CATEGORY CARD | UNIT ORGANIZING RULES | PLAY ITEM CLASSIFICATION |
|---|---|---|---|
| CHARACTER CARD | 0000 | NECESSARY | MAIN PLAY ITEM |
| MACHINE CARD | 0001 | NECESSARY | SUB PLAY ITEM |
| WEAPON CARD | 0010 | OPTIONAL | (DITTO) |
| CUSTOM CARD | 0011 | OPTIONAL | (DITTO) |

| CATEGORY NAME | | CARD IDENTIFICATION CODE | | DATA ITEMS RELATED TO ATTRIBUTE INFORMATION |
|---|---|---|---|---|
| | | CATEGORY | CLASSIFICATION | |
| MAIN PLAY CARD | CHARACTER CARD | 0000 | 0000 | COST, HIT PROBABILITY, EVASION SUCCESS RATE, MACHINE COMPATIBILITY, ETC. |
| | | 0000 | 0001 | |
| | | 0000 | 0010 | |
| | | 0000 | 0011 | |
| | MACHINE CARD | 0001 | 0000 | COST, HIT POINT, DEFENSIVE POWER, TRAVELING SPEED, GEOGRAPHICAL PROPERNESS, OUTPUT CHARACTERISTICS OF ARMED WEAPON, WEAPON SUITABILITY, ETC. |
| | | 0001 | 0001 | |
| | | 0001 | 0010 | |
| SUB PLAY CARD | WEAPON CARD | 0010 | 0000 | COST, WEAPON ATTRIBUTE, OFFENSIVE POWER, WEAPON HIT PROBABILITY, ATTACK RANGE, DURABILITY, MACHINE COMPATIBILITY, GEOGRAPHICAL PROPERNESS, ETC. |
| | | 0010 | 0001 | |
| | | 0010 | 0010 | |
| | | 0010 | 0011 | |
| | | 0010 | 0100 | |
| | CUSTOM CARD | 0011 | 0000 | COST, CUSTOM EFFECT |
| | | 0011 | 0001 | |

| ERROR NO. | ERROR CONTENTS | ERROR DETERMINATION METHOD |
|---|---|---|
| 01 | UNIT DOES NOT INCLUDE ONE CHARACTER CARD | DETERMINE WHETHER CATEGORY CODE "0000" IS INCLUDED IN CARD IDENTIFICATION CODES OF GROUP OF CARDS MAKING UP UNIT |
| 02 | UNIT DOES NOT INCLUDE MACHINE CARD | DETERMINE WHETHER CATEGORY CODE "0001" IS INCLUDED IN CARD IDENTIFICATION CODES OF GROUP OF CARDS MAKING UP UNIT |
| 03 | MACHINE CARD UNUSABLE FOR SELECTED BATTLE STAGE IS INCLUDED | CHECK WHETHER ATTRIBUTE INFORMATION "GEOGRAPHICAL PROPERNESS" OF MACHINE CARD MATCHES SELECTED BATTLE STAGE |
| 04 | WEAPON CARD UNBEARABLE BY SELECTED MACHINE CARD IS INCLUDED | COLLATE ATTRIBUTE INFORMATION "WEAPON SUITABILITY" OF MACHINE CARD AND ATTRIBUTE INFORMATION "MACHINE COMPATIBILITY" OF WEAPON CARD |
| 05 | COST EXCEEDS LIMIT VALUE | MAKE COMPARISON WITH COST VALUE READ FROM IC CARD |
| | | |

| Unit Number | Card Configuration | | | | Attribute Information | | | | | | | |
|---|---|---|---|---|---|---|---|---|---|---|---|---|
| | Category Name | Card Name | Category Classification | Card Identification Code | COST | | | | | | | |
| 1 | CHARACTER CARD | AA1 | 0000 | 0000 | 50 | SHOOTING HIT PROBABILITY 60 | FIGHTING HIT PROBABILITY 70 | EVASION SUCCESS RATE 70 | MACHINE COMPATIBILITY xxx | ... | ... | ... |
| | MACHINE CARD | BB1 | 0001 | 0000 | 50 | HP 100 | DEFENSIVE POWER 30 | TRAVELING SPEED 50 | ROTATIONAL SPEED 30 | GEOGRAPHICAL PROPERNESS xxx | WEAPON SUITABILITY xxx | ... |
| | WEAPON CARD | CC1 | 0010 | 0000 | 10 | WEAPON ATTRIBUTE xxx | OFFENSIVE POWER 10 | HIT PROBABILITY 40 | ATTACK RANGE xxx | NUMBER OF ROUNDS LOADED 10 | MACHINE COMPATIBILITY xxx | ... |
| | WEAPON CARD | CC2 | 0010 | 0001 | 10 | WEAPON ATTRIBUTE xxx | OFFENSIVE POWER 5 | HIT PROBABILITY 50 | ATTACK RANGE xxx | NUMBER OF ROUNDS LOADED 5 | MACHINE COMPATIBILITY xxx | ... |
| | CUSTOM CARD | DD1 | 0011 | 0000 | 20 | CUSTOM EFFECT xxx | — | — | — | — | — | ... |
| 2 | CHARACTER CARD | AA2 | 0000 | 0001 | 40 | SHOOTING HIT PROBABILITY 70 | FIGHTING HIT PROBABILITY 70 | EVASION SUCCESS RATE 60 | MACHINE COMPATIBILITY xxx | ... | ... | ... |
| | MACHINE CARD | BB2 | 0001 | 0010 | 40 | HP 120 | DEFENSIVE POWER 20 | TRAVELING SPEED 60 | ROTATIONAL SPEED 30 | GEOGRAPHICAL PROPERNESS xxx | WEAPON SUITABILITY xxx | ... |
| | WEAPON CARD | CC3 | 0010 | 0010 | 20 | WEAPON ATTRIBUTE xxx | OFFENSIVE POWER 10 | HIT PROBABILITY 60 | ATTACK RANGE xxx | NUMBER OF ROUNDS LOADED 5 | MACHINE COMPATIBILITY xxx | ... |

| Unit Number | Category Name | Card Name | Card Identification Code / Category Classification | Cost | Attribute Information |
|---|---|---|---|---|---|
| 1 | CHARACTER CARD | AA1 | 0000 / 0000 | 50 | SHOOTING HIT PROBABILITY 60; FIGHTING HIT PROBABILITY 70; EVASION SUCCESS RATE 70; MACHINE COMPATIBILITY xxx; ... ; ... ; ... |
| 1 | MACHINE CARD | BB1 | 0000 / 0001 | 50 | HP 100; DEFENSIVE POWER 30; TRAVELING SPEED 50; ROTATIONAL SPEED 30; GEOGRAPHICAL PROPERNESS xxx; WEAPON SUITABILITY xxx; ... |
| 1 | WEAPON CARD | CC1 | 0000 / 0010 | 10 | WEAPON ATTRIBUTE xxx; OFFENSIVE POWER 10; HIT PROBABILITY 60; ATTACK RANGE xxx; NUMBER OF ROUNDS LOADED 10; MACHINE COMPATIBILITY xxx; ... |
| 1 | WEAPON CARD | CC2 | 0001 / 0010 | 10 | WEAPON ATTRIBUTE xxx; OFFENSIVE POWER 5; HIT PROBABILITY 50; ATTACK RANGE xxx; NUMBER OF ROUNDS LOADED 5; MACHINE COMPATIBILITY xxx; ... |
| 1 | CUSTOM CARD | DD1 | 0000 / 0011 | 20 | CUSTOM EFFECT xxx; —; —; —; —; —; ... |
| 2 | CHARACTER CARD | AA2 | 0000 / 0000 | 40 | SHOOTING HIT PROBABILITY 70; FIGHTING HIT PROBABILITY 70; EVASION SUCCESS RATE 60; MACHINE COMPATIBILITY xxx; ... ; ... ; ... |
| 2 | MACHINE CARD | BB2 | 0001 / 0001 | 40 | HP 120; DEFENSIVE POWER 20; TRAVELING SPEED 60; ROTATIONAL SPEED 30; GEOGRAPHICAL PROPERNESS xxx; WEAPON SUITABILITY xxx; ... |
| 2 | WEAPON CARD | CC3 | 0010 / 0010 | 20 | WEAPON ATTRIBUTE xxx; OFFENSIVE POWER 10; HIT PROBABILITY 60; ATTACK RANGE xxx; NUMBER OF ROUNDS LOADED 5; MACHINE COMPATIBILITY xxx; ... |

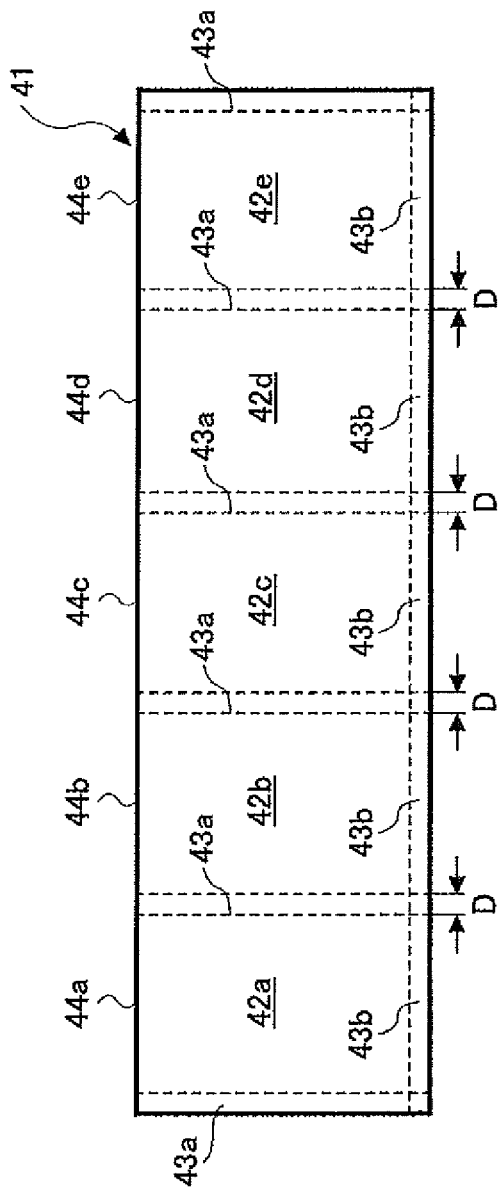

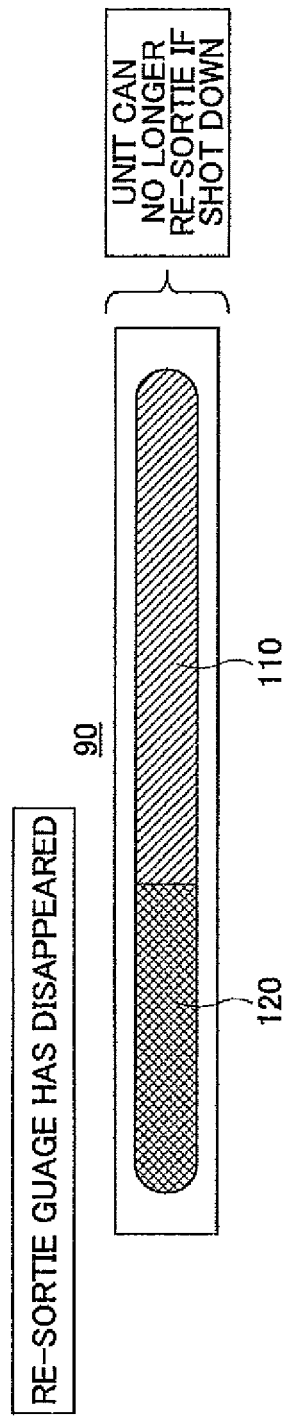

| | [RE-SORTIE EXAMPLE 1] |
|---|---|
| CONDITION | PLAYER A: ORGANIZATION COST 500, RE-SORTIE COST 400<br>UNIT A1: COST 300<br>UNIT A2: COST 200 |
| FIRST SHOOTING DOWN:<br>IN CASE OF SHOOTING DOWN OF UNIT A1 | (1-1)<br>*BEFORE SHOOTING DOWN, UNITS ON PLAYER A SIDE ARE TWO UNITS A1 AND A2.<br>IN THIS CASE, SINCE (REMAINING RE-SORTIE COST > UNIT COST),<br>[RE-SORTIE COST REMAINING LEVEL] 400 − [SHOT-DOWN UNIT: A1 COST] 300 = 100,<br>AND UNIT A1 IS CAUSED TO RE-SORTIE WITHOUT PENALTY.<br>IN THIS CASE, "RE-SORTIE GAUGE REMAINING LEVEL" = 100/400 = 0.25 = 25%.<br>("FINAL GAUGE REMAINING LEVEL" = 1000/1000 = 1 = 100%, BUT IS NOT DISPLAYED.) |
| SECOND SHOOTING DOWN:<br>IN CASE OF ANOTHER SHOOTING DOWN OF UNIT A1 | (1-2)A<br>*BEFORE SHOOTING DOWN, UNITS ON PLAYER A SIDE ARE TWO UNITS A1 AND A2.<br>IN THIS CASE, SINCE (REMAINING RE-SORTIE COST < UNIT COST),<br>[RE-SORTIE COST REMAINING LEVEL] 100/[SHOT-DOWN UNIT: A1 COST] 300 = 0.333,<br>AND UNIT A1 IS CAUSED TO RE-SORTIE WITH PENALTY COEFFICIENT OF 0.333.<br>IN THIS CASE, "RE-SORTIE GAUGE REMAINING LEVEL" = 0/400 = 0 = 0%, AND<br>"FINAL GAUGE REMAINING LEVEL" = 500/500 = 1 = 100% AND IS DISPLAYED AT THIS POINT. |
| SECOND SHOOTING DOWN:<br>IN CASE OF FURTHER SHOOTING DOWN OF UNIT A2 | (1-2)B<br>*BEFORE SHOOTING DOWN, UNITS ON PLAYER A SIDE ARE TWO UNITS A1 AND A2.<br>IN THIS CASE, SINCE (REMAINING RE-SORTIE COST < UNIT COST),<br>[RE-SORTIE COST REMAINING LEVEL] 100/[SHOT-DOWN UNIT: A2 COST] 200 = 0.500,<br>AND UNIT A2 IS CAUSED TO RE-SORTIE WITH PENALTY COEFFICIENT OF 0.500.<br>IN THIS CASE, "RE-SORTIE GAUGE REMAINING LEVEL" = 0/400 = 0 = 0%, AND<br>"FINAL GAUGE REMAINING LEVEL" = 500/500 = 1 = 100% AND IS DISPLAYED AT THIS POINT. |
| THIRD SHOOTING DOWN:<br>IN CASE OF ANOTHER SHOOTING DOWN OF UNIT A1 | (1-3)<br>*BEFORE SHOOTING DOWN, UNITS ON PLAYER A SIDE ARE TWO UNITS A1 AND A2.<br>PROCESSING IS PERFORMED THE SAME AS CONVENTIONALLY (IN OLD VERSION).<br>[FINAL GAUGE REMAINING LEVEL] 500 − [SHOT-DOWN UNIT: A1 COST] 300 = 200,<br>AND SHOT-DOWN UNIT A1 NO LONGER SORTIES.<br>AT THIS POINT, "FINAL GAUGE REMAINING LEVEL" = 200/500 = 0.40 = 40%. |
| FOURTH SHOOTING DOWN:<br>IN CASE OF ANOTHER SHOOTING DOWN OF UNIT A2 | (1-4)<br>*BEFORE SHOOTING DOWN, UNIT A2 IS ONLY UNIT ON PLAYER A SIDE.<br>PROCESSING IS PERFORMED THE SAME AS CONVENTIONALLY (IN OLD VERSION).<br>[FINAL GAUGE REMAINING LEVEL] 200 − [SHOT-DOWN UNIT: A2 COST] 200 = 0,<br>AND SHOT-DOWN UNIT A2 NO LONGER SORTIES. AT THIS POINT, "FINAL GAUGE REMAINING LEVEL" = 0/500 = 0.00 = 0%, AND WIN/LOSS DETERMINATION IS PERFORMED. |

| | [RE-SORTIE EXAMPLE 2] |
|---|---|
| CONDITION | PLAYER B: ORGANIZATION COST 1000, RE-SORTIE COST 400<br>UNIT B1: COST 500<br>UNIT B2: COST 400<br>UNIT B3: COST 100 |
| FIRST SHOOTING DOWN:<br>IN CASE OF SHOOTING<br>DOWN OF UNIT B1 | (2-1)A<br>*BEFORE SHOOTING DOWN, UNITS ON PLAYER B SIDE ARE THREE UNITS B1, B2, AND B3.<br>IN THIS CASE, SINCE (REMAINING RE-SORTIE COST < UNIT COST),<br>[RE-SORTIE COST REMAINING LEVEL] 400/[SHOT-DOWN UNIT: A1 COST] 500 = 0.800,<br>AND UNIT B1 IS CAUSED TO RE-SORTIE WITH PENALTY COEFFICIENT OF 0.800.<br>IN THIS CASE, "RE-SORTIE GAUGE REMAINING LEVEL" = 0/400 = 0 = 0%,<br>AND "FINAL GAUGE REMAINING LEVEL" = 1000/1000 = 1 = 100%<br>AND IS DISPLAYED AT THIS POINT. |
| FIRST SHOOTING DOWN:<br>IN CASE OF SHOOTING<br>DOWN OF UNIT B3 | (2-1)C<br>IN THIS CASE, SINCE (REMAINING RE-SORTIE COST > UNIT COST),<br>[RE-SORTIE COST REMAINING LEVEL] 400 - [SHOT-DOWN UNIT: B3 COST] 100 = 300,<br>AND UNIT B3 IS CAUSED TO RE-SORTIE WITHOUT PENALTY.<br>IN THIS CASE, "RE-SORTIE GAUGE REMAINING LEVEL" = 300/400 = 0.75 = 75%.<br>("FINAL GAUGE REMAINING LEVEL" = 1000/1000 = 1 = 100%, BUT IS NOT DISPLAYED.) |

| | |
|---|---|
| | [GAME EXAMPLE 1]<br>(THERE ARE TWO PLAYERS A AND B AND A WINS: BOTH HAVE ONLY FINAL GAUGE) |
| CONDITION | PLAYER A: ORGANIZATION COST 500, RE-SORTIE COST 400<br>    UNIT A1: COST 300<br>    UNIT A2: COST 200<br><br>PLAYER B: ORGANIZATION COST 1000, RE-SORTIE COST 400<br>    UNIT B1: COST 500<br>    UNIT B2: COST 400<br>    UNIT B3: COST 100 |
| WIN/LOSS DETERMINATION EXAMPLE 1-1 | PLAYER A SHOOTING DOWN CONDITIONS: A1 AND A2 HAVE BEEN SHOT DOWN IN THIS ORDER<br>PLAYER B SHOOTING DOWN CONDITIONS: B1 AND B2 HAVE BEEN SHOT DOWN, AND TIME IS UP |
| CONVENTIONAL CASE | PLAYER A: POWER GAUGE REMAINING LEVEL = 0/500 = 0<br>PLAYER B: POWER GAUGE REMAINING LEVEL = 100/1000 = 0.10<br>  > PLAYER B WINS<br>: EXPERIENCED PLAYER RICH IN CARD ASSETS (HER/HIS OWN UNIT CARDS) HAS ADVANTAGE. IN CASE OF TRADING-CARD-TYPE GAME, IT IS DESIRABLE AT THE BEGINNING OF INTRODUCTION BECAUSE IT IS EASY TO UNDERSTAND DIFFERENCE IN FIGHTING FORCE. HOWEVER, THERE IS PROBLEM IN THAT IT IS DIFFICULT FOR PLAYER THAT DOES NOT HAVE CARDS TO JOIN GAME LATER IN SPREAD PERIOD AFTER INTRODUCTION. |
| PRESENT INVENTION | PLAYER A: POWER GAUGE REMAINING LEVEL = 500/500 = 1.00<br>PLAYER B: POWER GAUGE REMAINING LEVEL = 600/1000 = 0.60<br>  > PLAYER A WINS<br>: EXPERIENCED PLAYER RICH IN CARD ASSETS (HER/HIS OWN UNIT CARDS) HAS ADVANTAGE, BUT BEGINNER ALSO HAS MORE CHANCES TO WIN DEPENDING ON HOW OPERATIONS ARE PLANNED. IN CASE OF TRADING-CARD-TYPE GAME, THIS SERVES AS REMEDY FOR BEGINNERS EVEN IN SPREAD PERIOD AFTER INTRODUCTION, AND HIGHLY STRATEGIC CHARACTERISTICS CAN BE PROVIDED THROUGH WIDER RANGE OF OPTIONS IN STRATEGIC DEVELOPMENT IN CASE OF EXPERIENCE PLAYERS AGAINST EACH OTHER AS WELL. |

| | |
|---|---|
| CONDITION | [GAME EXAMPLE 2]<br>(THERE ARE TWO PLAYERS A AND B AND B WINS: RE-SORTIE GAUGE REMAINS FOR BOTH PLAYERS)<br><br>PLAYER A: ORGANIZATION COST 500, RE-SORTIE COST 400<br>UNIT A1: COST 300<br>UNIT A2: COST 200<br><br>PLAYER B: ORGANIZATION COST 1000, RE-SORTIE COST 400<br>UNIT B1: COST 500<br>UNIT B2: COST 400<br>UNIT B3: COST 100 |
| WIN/LOSS DETERMINATION EXAMPLE 2-1 | PLAYER A SHOOTING DOWN CONDITIONS: A1 HAS BEEN SHOT DOWN, AND TIME IS UP<br>PLAYER B SHOOTING DOWN CONDITIONS: B1 HAS BEEN SHOT DOWN, AND TIME IS UP |
| CONVENTIONAL CASE | PLAYER A: POWER GAUGE REMAINING LEVEL = 200/500 = 0.40<br>PLAYER B: POWER GAUGE REMAINING LEVEL = (400+100)/1000 = 0.50<br>> PLAYER B WINS<br>∴ EXPERIENCED PLAYER RICH IN CARD ASSETS (HER/HIS OWN UNIT CARDS) HAS ADVANTAGE. IN CASE OF TRADING-CARD-TYPE GAME, IT IS DESIRABLE AT THE BEGINNING OF INTRODUCTION BECAUSE IT IS EASY TO UNDERSTAND DIFFERENCE IN FIGHTING FORCE. HOWEVER, THERE IS PROBLEM IN THAT PARTICULAR TACTICS ARE LIKELY TO BECOME STEREOTYPED AMONG EXPERIENCED PLAYERS HAVING MANY HIGH-COST UNITS IN SPREAD PERIOD AFTER INTRODUCTION. |
| PRESENT INVENTION | PLAYER A: RE-SORTIE GAUGE REMAINING LEVEL = (400-300)/400 = 0.25<br>PLAYER B: RE-SORTIE GAUGE REMAINING LEVEL = 0.00<br>> PLAYER A WINS<br>IN CASE OF TRADING-CARD-TYPE GAME, HIGHLY STRATEGIC CHARACTERISTICS CAN BE PROVIDED THROUGH WIDER RANGE OF OPTIONS IN STRATEGIC DEVELOPMENT, SUCH AS "DARING TO USE WEAK, LOW-COST UNIT" OR "USING HER/HIS LOW-COST MACHINE AS BAIT TO TARGET HIGH-COST MACHINE OF OPPONENT," IN CASE OF EXPERIENCED PLAYERS AGAINST EACH OTHER IN SPREAD PERIOD AFTER INTRODUCTION. |

GAME CONTROLLING METHOD, STORAGE MEDIUM, AND GAME APPARATUS

TECHNICAL FIELD

The present invention relates to a game controlling method that controls game execution based on a numerical value (cost) set for each of multiple units in a game apparatus where players play a versus game by combining their respective units; a storage medium; and a game apparatus.

BACKGROUND ART

Conventionally, card game apparatuses that use a card (trading card) as a play item to serve as a medium for playing a game have been put to practical use. For example, soccer game apparatuses are well known as such card game apparatuses. In the soccer card game apparatus, in response to a player (gamer) arranging player cards on a player card disposition panel (hereinafter referred to as "playfield"), an internal image sensor reads the card data recorded on the bottom sides of the player cards, and data on a team made up of multiple players are created from these player cards, so that a game is started. The player is allowed to give instructions on the positions or formation of the players by changing the disposition of the player cards on the playfield. In such a card game, one player card is newly paid out to the player every time a game is played. Therefore, the player has pleasure in being able to collect a new card usable in a card game, such as a player card. Further, in addition to the above-described soccer card game, card game apparatuses have been provided for playing a battle game of wild times in a civil war period.

In these card game apparatuses, the information recorded in multiple cards placed on a playfield is read and the movements of the cards are detected with a game progress control program, so that the progress of a game is controlled. Further, the game allows players to play against each other or allows a single player to play against a computer. Examples of such card game apparatuses include the invention described in Patent Document 1, which has been proposed by the applicant of the present application.

The card game apparatus described in Patent Document 1 is the above-described soccer card game apparatus. In this card game apparatus described in Patent Document 1, in response to a player selecting player cards from multiple player cards having respective specific card information and placing them on a playfield, an image sensor provided inside the game apparatus reads the specific card information recorded on the bottom sides of the player cards so that data on a team made up of multiple players are created. When a game starts, a game progress control program is caused to control the progress of the game by detecting the movements and positions of the player cards.

Further, Patent Document 1 also shows that the card information recorded on the bottom side of a player card is composed of a code pattern and that there is provided means for detecting the position and orientation of the card placed on the playfield by analyzing the information of the code pattern.

Further, according to the card game apparatus described in Patent Document 1, the player can give instructions on the positions and formation of the players by moving the player cards placed on the playfield in a sliding manner. Further, shooting is executed by the player operating on a SHOOT button, and an image representing this is displayed on a monitor. When one game ends, a new player card is paid out from the card payout part of the card game apparatus, so that the player can newly add on one player card. Patent Document 1 discloses that use of this newly added player card makes it easy for the player to make player choices or change players when playing the next game.

Since the card game apparatus described in Patent Document 1 is a soccer card game, the player proceeds with a game while moving 11 player cards placed on the playfield. Further, the attribute (parameter) information of a corresponding player, such as shooting strength, is stored for each player card in the storage unit of the card game apparatus. Accordingly, the player can play a game full of variety.

However, for example, in games where one or more units are organized to play against enemy units, such as battle games of wild times in a civil war period or space war games, adopting the below-described means allows players to play games more strategically.

(1) Enabling a player to organize one or more units made up of a group of multiple cards in consideration of game tactics before playing a game.

(2) Controlling the progress of the game so that the player can play the role of a commander (captain) that commands the units during the play of the game.

In order to adopt the means described above in (1) and (2), the player organizes a unit made up of multiple cards as a preparation for starting a game, and it is necessary to record the specific information pre-recorded in a group of these organized multiple cards in the storage unit of the game apparatus on a unit basis as information forming a single unit. Further, during the play of a battle game, all cards making up one or more units are not moved on the playfield, but a main card (main play item) of a card group forming each unit is predetermined. Therefore, the player may move only this main play item on the playfield, so that the player's card operation is extremely simplified.

[Patent Document 1] Japanese Laid-Open Patent Application No. 2002-301264

DISCLOSURE OF THE INVENTION

Problems to be Solved by the Invention

Game apparatuses have been developed that thus organize a unit made up of a group of multiple play items such as cards and control execution of a game on a unit basis. In such game apparatuses, a cost value is preset for each unit by a program. Further, with respect to players, a limit is set to a total cost usable by each player. Further, each player selects cards to be brought into the game from among her/his own cards based on a study of strategy as to how to proceed with the game advantageously within the limitation. The game apparatus adjusts the cost value of a unit into which the selected cards are combined, and proceeds with the game with units (groups) organized within the total usable cost.

On the other hand, in the game apparatus, the cost value of units (groups) set by the player and the cost value of units (groups) set by another player or a computer are read, and the players are caused to play against each other or the player is caused to play against the computer in a virtual space. If there is a unit attacked and damaged, the cost value set for the unit is subtracted from the total cost set for the corresponding player, and the computer determines that a player whose total cost has become zero is a loser.

In such a game apparatus, a player with more cards has a greater advantage because the player can handle a large number of units. For example, in the case of a beginner who possesses only a single set of cards purchased, even if the total usable cost is not limited to some extent, it is rather difficult to win because fewer units are available so that the number of units is limited although the total cost is low. Further, beginners with a small number of cards have a low latitude of combination in combining cards to organize units while experienced players with a large number of cards can play with organizational variety by changing combinations of the large number of cards. Further, in the case of a system where a player who wins a game gets promotion in rank to have an increase in the total usable cost, beginners who have played only a few times are low in the total usable cost, for which beginners are disadvantaged all the more. In particular, in a game system where multiple players participate simultaneously, game pairings are often determined at random by a computer. In such a case, it is not possible to choose an opponent, so that there may be a match-up of a beginner and an experienced player. In this case, the beginner loses frequently and cannot enjoy the game, thus having the impression that the game is not interesting. This discourages participation of new players.

Further, in the case of a match-up of experienced players, although the number of cards and the total usable cost of units that can be brought into one game increase as the number of games increases, it is often the case that games are played in a uniform manner with only high-performance, high-cost units. Therefore, the players feel that games are simplified to their dissatisfaction, so that there is the problem of a shortened life cycle of a product on the producer side.

Therefore, in view of the above-described situations, the present invention has an object of providing a game controlling method, a storage medium, and a game apparatus that solve the above-described problems.

Means for Solving the Problems

The present invention solves the above-described problems by providing a game controlling method, where cost values are preset for items usable by players and a usable total cost value possessed by each of the players is set for each of the players, the game controlling method subtracting the cost value set for an eliminated one of the items from the total cost value of a corresponding one of the players, the game controlling method including storing the usable total cost value different for each of the players; storing a reserve cost value of a certain amount separately from the original total cost value of each of the players; and calculating the total cost value and the reserve cost value separately in subtracting the cost numerical value.

Further, the present invention solves the above-described problems by providing the game controlling method as claimed in claim 1 with comparing a remaining amount of the reserve cost value and the cost value set for the eliminated one of the items in response to the elimination of the one of the items; computing a penalty coefficient based on a result of the comparison; and changing a parameter of the eliminated one of the items from the penalty coefficient and causing the eliminated one of the items to re-enter.

Further, the present invention solves the above-described problems by providing the game controlling method as claimed in claim 1 with computing a number of other items used by the corresponding one of the players having used the eliminated one of the items in causing the eliminated one of the items to re-enter after passage of a predetermined time; determining a re-enter coefficient numerical value based on the number of items; and causing the eliminated one of the items to re-enter after passage of a time determined from the re-enter coefficient numerical value.

Further, the present invention solves the above-described problems by providing the game controlling method as claimed in claim 1 with varying a numerical value of the cost value set for the one of the items to be caused to re-enter and a preset time required before the re-entering after the elimination in causing the eliminated one of the items to re-enter after passage of a predetermined time.

Further, the present invention solves the above-described problems by reading a storage medium containing a program for executing the game controlling method as claimed in any of claims 1 to 4.

Further, the present invention solves the above-described problems by providing a game apparatus, where cost values are preset for items usable by players and a usable total cost value possessed by each of the players is set for each of the players, the game apparatus subtracting the cost value set for an eliminated one of the items from the total cost value of a corresponding one of the players, including first storage means for storing the usable total cost value different for each of the players; second storage means for storing a reserve cost value of a certain amount separately from the original total cost value of each of the players; and computation means for calculating the total cost value and the reserve cost value separately in subtracting the cost numerical value.

Effects of the Invention

According to the present invention, a usable total cost value different for each player is stored, a reserve cost value of a certain amount is stored separately from the original total cost value of each player, and the total cost value and the reserve cost value are calculated separately in subtracting a cost numerical value. As a result, for example, if there is a reserve cost value, it is possible to cause an item destroyed by an attack to re-sortie into a virtual space. Accordingly, if an item of each player is destroyed, it is possible to cause the same item to rejoin the game, and for example, in the case of a low-cost-value item, it is possible to eliminate the dissatisfaction of a beginner by increasing the number of re-sorties per game.

Further, according to the present invention, the number of other items used by the corresponding one of the players having used the eliminated one of the items is computed in causing the eliminated one of the items to re-enter after passage of a predetermined time, a re-enter coefficient numerical value is determined based on the number of items, and the eliminated one of the items is caused to re-enter after passage of a time determined from the re-enter coefficient numerical value. This makes it possible to prevent a player in a favorable situation from winning one-sidedly because of a re-sortie of an item and enable players to play a close game.

Further, according to the present invention, if the reserve cost value is shorter than the cost of the main body, a specific value set for each type of unit of the unit that has re-sortied, such as "HP" (HIT POINT, so-called stamina), is corrected with a computing equation including a predetermined penalty so as to be discounted from its original value in proportion to the shortage. Therefore, it is possible to prevent a unit of a high cost value from re-sortieing under favorable conditions although the reserve cost value is constant, so that it is possible to improve the satisfaction of each player.

Further, according to the present invention, the numerical value of the cost value set for the one of the items to be caused to re-enter and a preset time required before the re-entering after the elimination are changed in causing the eliminated one of the items to re-enter after passage of a predetermined time. This makes it possible to prevent a player in a favorable situation from winning one-sidedly because of a re-sortie of an item and enable players to play a close game.

BRIEF DESCRIPTION OF THE DRAWINGS

FIG. 6 is a diagram for illustrating an example of organizing conditions with respect to multiple cards making up a unit for organizing the unit.

FIG. 7 is a diagram for illustrating cards for organizing a unit and data items related to the attribute information preset for the cards.

FIG. 13 is a diagram for illustrating a method of determining whether a unit made up of a group of multiple cards meets unit organizing rules, and an example of the rules.

FIG. 14 is a diagram for illustrating a data configuration of a unit data table with respect to information related to a unit organized by a player.

FIG. 15 is a diagram for illustrating an example where the attribute information of a machine card is corrected based on attribute information with respect to the unit data table shown in FIG. 14.

FIG. 16 is a plan view for illustrating a configuration of a card sleeve.

FIG. 24C is a diagram showing a display of the cost gauge 90 where the re-sortie gauge has disappeared.

FIG. 26 is a diagram showing an example 1 of the game progress of a re-sortie.

FIG. 27 is a diagram showing an example 2 of the game progress of a re-sortie.

FIG. 28 is a diagram showing the progress of a game based on the combinations of the cost values of units in the case where Players A and B meet and A (beginner) wins.

FIG. 29 is a diagram showing the progress of a game based on the combinations of the cost values of units in the case where Players A and B meet and B (experienced player) wins.

DESCRIPTION OF THE REFERENCE NUMERALS

Figure 1:
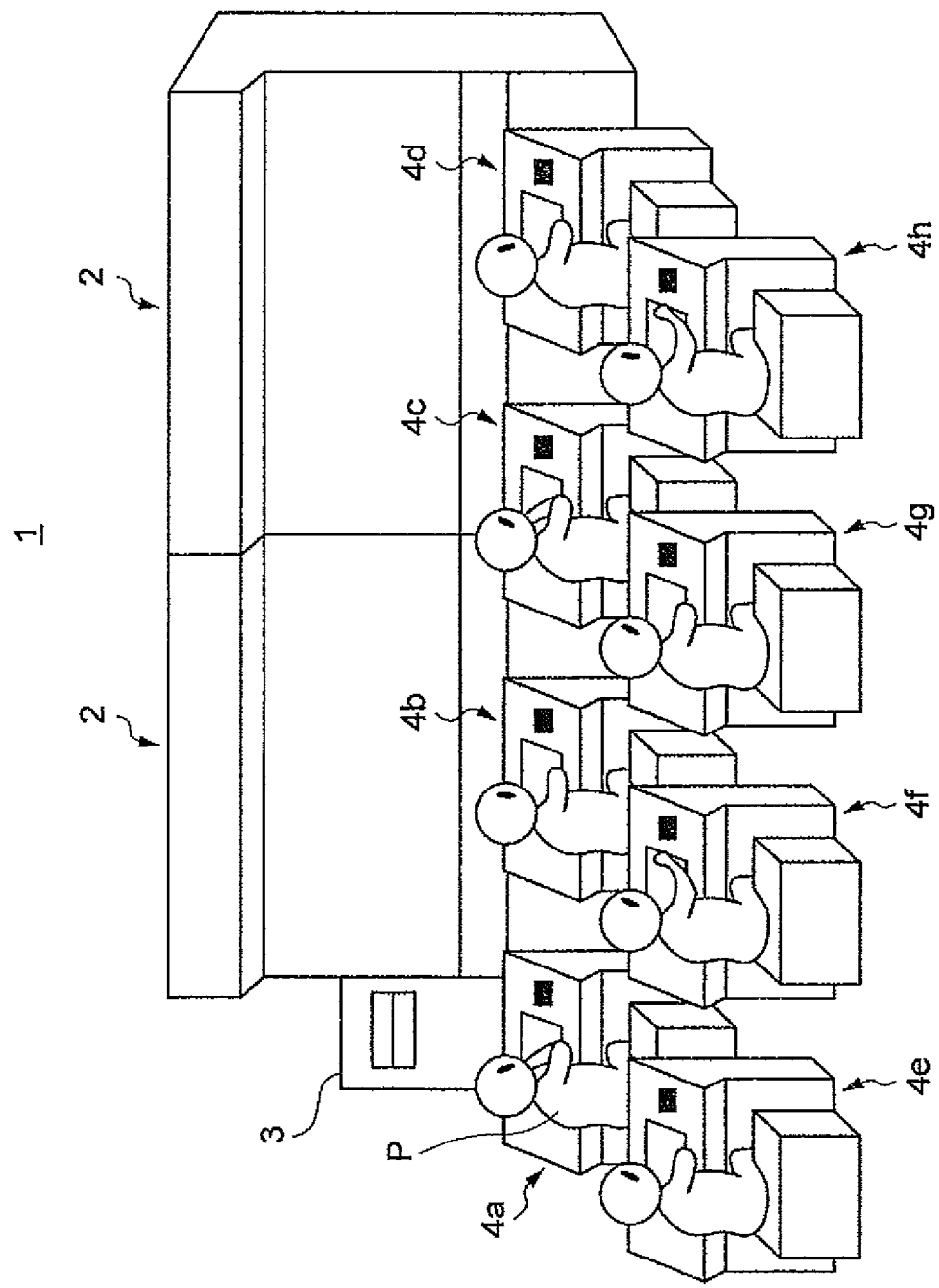
FIG. 1 is a perspective view showing the overall configuration of a card game apparatus showing an embodiment of the present invention.

1: Card game apparatus
3: Main control part
4a through 4h: Terminal units
5: IC card
6: Card
7: Playfield
8: Display unit
9: IC card reader/writer
9a: Coin deposition unit
10: Card payout unit
11: Selection buttons
12: Action button
23: CPU
24: RAM
35: Light source
40: Image sensor
41: Card sleeve
90: Cost gauge
100: Re-sortie gauge
110: Power gauge
200, 210: Re-sortie examples
220, 230: Cost setting examples

BEST MODE FOR CARRYING OUT THE INVENTION

Figure 2:
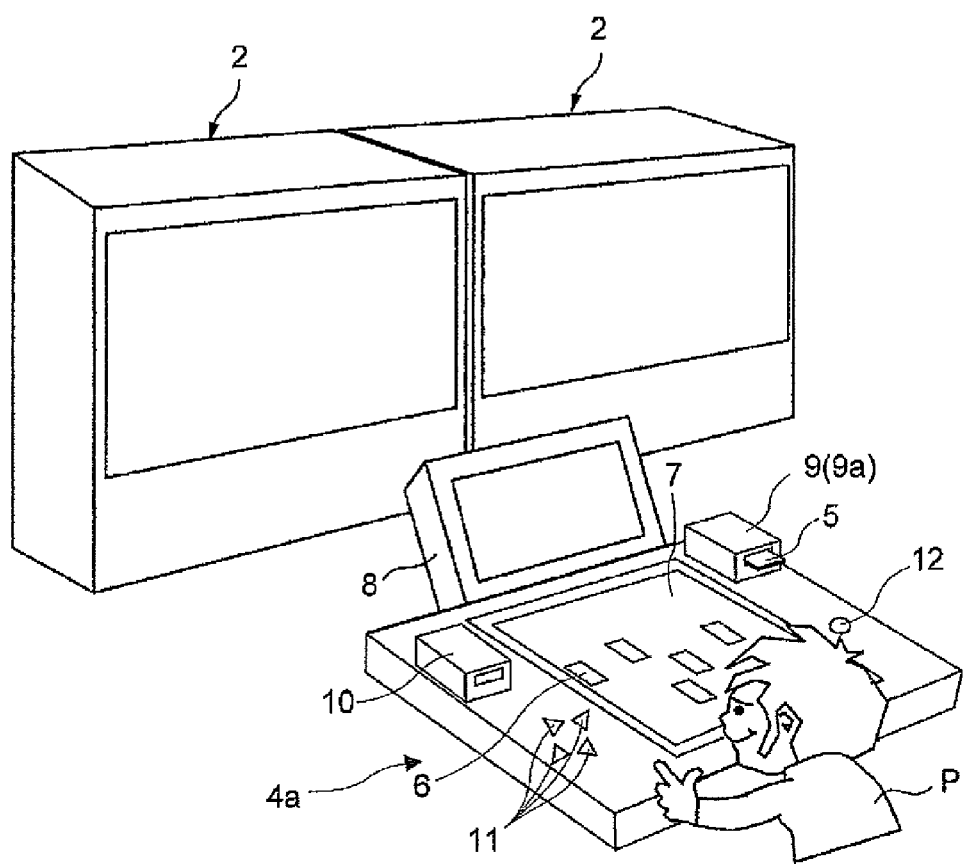
FIG. 2 is a perspective view showing a terminal unit operated by each player in the card game apparatus shown in FIG. 1.

A description is given below of an embodiment of the present invention, taking a game apparatus using a card as a play item as an example. FIG. 1 is a perspective view showing the overall configuration of a card game apparatus that is an embodiment of the present invention. FIG. 2 is a perspective view showing a terminal unit operated by each player in the card game apparatus. In the following description, a description is given of the case of applying the card game apparatus to a battle game.

As shown in FIG. 1 and FIG. 2, a card game apparatus 1 is made up of one or two large panel displays 2, a main control part 3 that controls display of the large panel displays 2, and multiple terminal units 4a through 4h connected to the main control part 3 in such a manner as to enable communications. Each of the terminal units 4a through 4h is a game apparatus of the present invention.

The title of a game, a battlefield map for making a selection from multiple battlefields prepared before the start of the game, the outcome of a battle, etc., are displayed on the large panel displays 2. A player P who takes part in the game for the first time first purchases a starter pack necessary to play the game, and takes a seat of the terminal units 4a through 4h. An IC card 5 and multiple cards 6 to serve as game media, that is, play items, at the time of playing the game are preset in this starter pack. In the following description, these play items are expressed as cards 6. The material of the cards 6 is desirably plastic or hard paper.

The IC card 5 is used as a recording medium for storing the name or nickname of the player P and recording game results data that are the results of game implementation. Further, the cost that can be used for one game by the player P is prestored in the IC card 5. When the player satisfies certain conditions such as winning a game, a predetermined value is added to the value of the cost usable for one game, and this cost is recorded in the IC card 5.

Further, the IC card 5 is used as means for determining whether the player P is eligible to participate in the game. Accordingly, when the player P plays the game for the first time using the purchased IC card 5, the player P performs the operation of recording her/his name or nickname.

The terminal units 4a through 4h have the same configuration. Therefore, a description is given of the terminal unit 4a shown in FIG. 2. The terminal unit 4a has a playfield 7 for the player P placing her/his own cards 6, a display unit 8 to serve as display means for displaying an image representing a battle, an IC card reader/writer 9 into which the IC card 5 is inserted, a coin deposition unit 9a, and a card payout unit 10 that pays out a new card 6 to the player P in response to the play of one game. FIG. 2 shows the IC card reader/writer 9 that integrates the IC card reader/writer 9 and the coin deposition unit 9a, which may be separate structures. The coin deposition unit 9a, which has a coin slot and a sensor that detects a deposited coin, serves as means for collecting a game charge when the player P starts a game.

The game apparatus according to the present invention enables players who operate these terminal units 4a through 4h to play games against each other, one taking on the other as an opponent (player T). Further, the player P can also play a game against the terminal unit 4a that the player P operates as an opponent.

Multiple kinds of selection buttons 11 used to enter the name of the player P and to move a cursor at the time of making a selection from a menu displayed on the large panel displays 2 or the display unit 8 are provided on the left side of the playfield 7. Further, various buttons (button switches) 12 such as an action button to be pressed at the time of perform "ATTACK EXECUTION" and three kinds of tactics buttons are provided on the right side of the playfield 7. These three kinds of tactics buttons are buttons for causing the player P to select one of the battle tactics of "OFFENSE ORIENTED," "MOBILITY ORIENTED," and "DEFENSE ORIENTED" when the game control is set to a battle mode.

Figure 3:
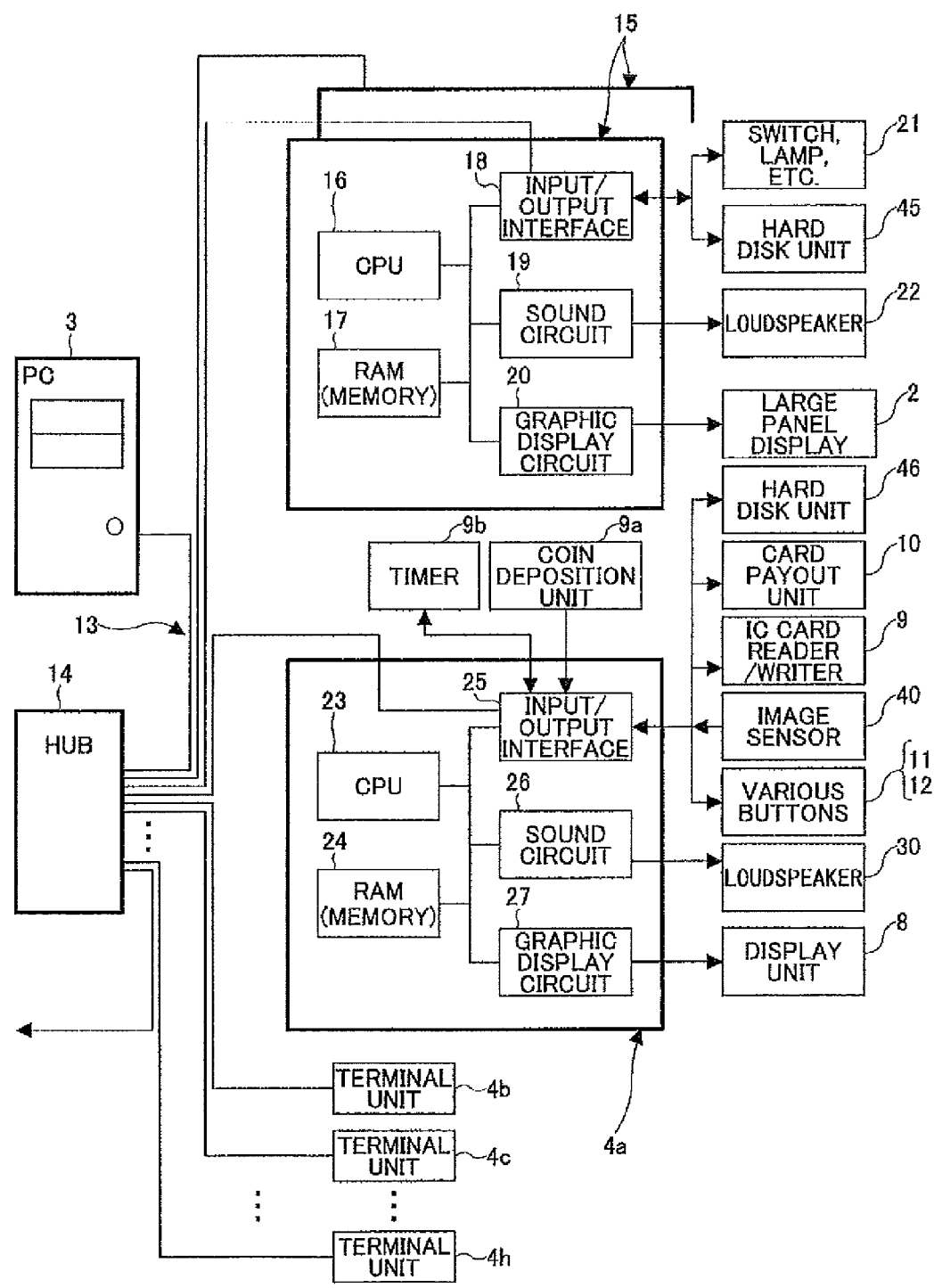
FIG. 3 is a block diagram showing a control system of the card game apparatus shown in FIG. 1.

FIG. 3 is a block diagram of a control system that controls the operation of the card game apparatus 1. A main control part 3 is connected to large panel control parts 15 for performing control of displaying various images on the large panel displays 2, the terminal units 4a through 4h, and an external communications network (not graphically illustrated) through a hub 14 of a LAN (Local Area Network) 13.

The large panel control parts 15 each have a control board including a CPU 16, a RAM 17 that is storage means (memory), an input/output interface 18, a sound circuit 19, and a graphic display circuit 20. The RAM 17 contains various image data to be displayed on the large panel displays 2, part or all of image data to be displayed on the display unit 8, and an image output control program that performs control to make selections from these image data, determine their order of priority, and cause them to be successively displayed.

The input/output interface 18 is connected to the main control part 3 through the hub 14, and a switch and the like 21 for operating the large panel displays 2, a hard disk unit 45 as an auxiliary (external) storage unit, etc., are connected to the input/output interface 18. The sound circuit 19 is connected to a sound amplifier (loudspeaker) 22 that outputs sound according to various images displayed on the large panel displays 2. Sound data and a sound output control program for outputting these sound data to the loudspeaker 22 are also contained in the RAM 24. The graphic display circuit 20 is made up of a circuit that causes an image selected by a control signal from the CPU 16 to be displayed on the large panel displays 2, and the like.

The terminal units 4a through 4h each has a control board including a CPU 23, a RAM 24 that is storage means (memory), an input/output interface 25, a sound circuit 26, and a graphic display circuit 27. The RAM 24 contains a game progress control program for controlling the progress of a game when the game is implemented by the card game apparatus 1 and attribute information (such as parameters) preset for each card 6 that is usable when the player P plays the game.

In addition to the main control part 3, the IC card reader/writer 9, the coin detection sensor (not graphically illustrated) of the coin deposition unit 9a, a timer 9b, the card payout unit 10, the selection buttons 11, and the various buttons 12 are connected to the input/output interface 25. Further, switches for operating the display unit 8, an image sensor 40 for reading the card data stored on the bottom sides of the cards 6, a hard disk unit 46 as an external storage unit, etc., are connected to the input/output interface 25. The timer 9b is used as means for counting elapsed time, but a software timer that counts elapsed time with a program may be adopted.

The sound circuit 26 is connected to a loudspeaker (sound amplifier) 30 that outputs sound according to various images displayed on the display unit 8. Sound data and a sound output control program for outputting these sound data to the loudspeaker 30 are also contained in the RAM 24. The graphic display circuit 27 causes an image selected by a control signal from the CPU 23 to be displayed on the display unit 8.

The hard disk unit 45 as an external storage unit shown in FIG. 3 contains a program for controlling the operation of the large panel control part 15. When the main control part 3 is turned ON, this program is read into the RAM 17. Likewise, the hard disk unit 46 stores a program for controlling the operation of the terminal unit 4a (game progress control program). When the terminal unit 4a is turned ON, this program is read into the RAM 24. In place of these hard disk units 45 and 46, for example, an external storage such as a CD-ROM may be used to cause the above-described programs contained in the CD-ROM to be read and stored (loaded) into the RAM 17 and the RAM 24 when the main control part 3 and the terminal unit 4a, respectively, are turned ON.

Figure 4:
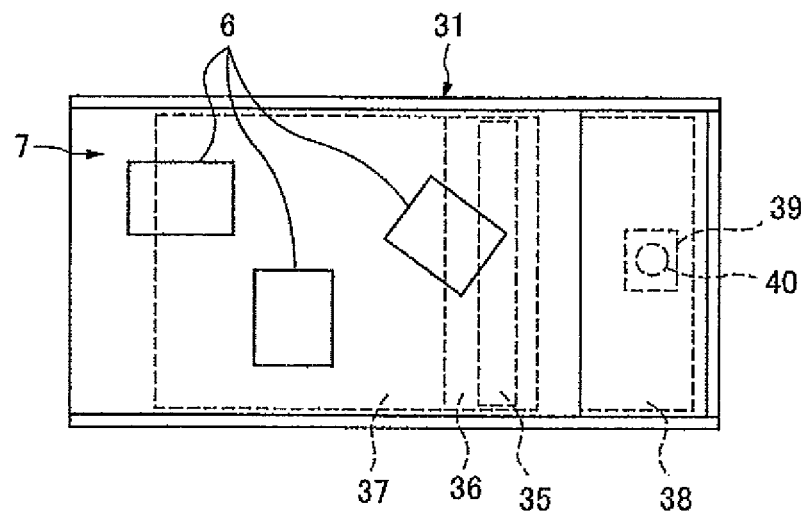
FIG. 4 is a plan view of a playfield provided to the card game apparatus shown in FIG. 2.
Figure 5:
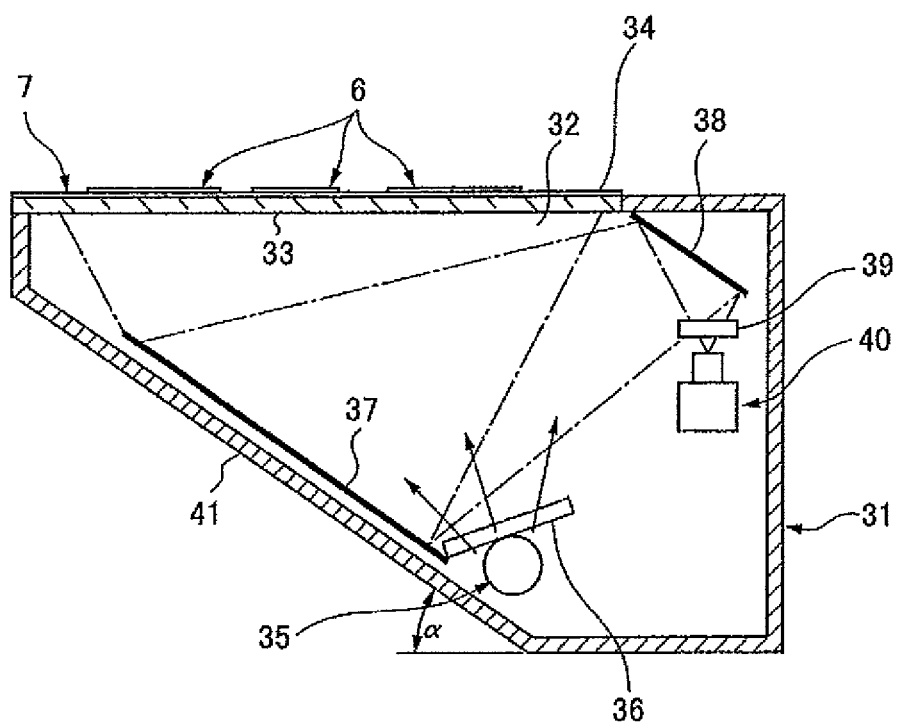
FIG. 5 is a longitudinal sectional view of a housing to which the playfield is attached.

FIG. 4 is a top plan view of the playfield 7. FIG. 5 is a longitudinal sectional view of a housing 31 to which the playfield 7 is attached. As shown in FIG. 4 and FIG. 5, the playfield 7 is made up of a transparent glass plate 33 attached so as to close an upper opening 32 of the housing 31 and a thin playfield sheet 34 stacked on the upper surface of the glass plate 33. For example, a polycarbonate or acrylic resin sheet may be used for the playfield sheet 34.

At the time of playing a game, the cards 6 are placed on the upper surface of the playfield sheet 34. When the player P takes on, for example, the player T who operates the terminal unit 4b, they place their cards 6 on the playfields 7 (playfield sheets 34) of their respective terminal units.

A light source 35 that emits infrared (invisible light) to the bottom sides of the cards 6 placed on the playfield 7, a first filter 36 that removes visible light from the light emitted from the light source 35, a first reflector plate 37 that reflects light reflected from the bottom sides of the cards 6 in an upward direction, and a second reflector plate 38, which reflects the light (invisible light) reflected from the first reflector plate 37 in a downward direction, are attached inside the housing 31. Further, a second filter 39 that removes disturbance light (visible light) included in the light reflected from the second reflector plate 38 and an image sensor 40 for capturing the images of and reading the code patterns recorded on the bottom sides of the cards 6 placed on the playfield 7 from the reflected light that has passed through the second filter 39 are attached inside the housing 31. The light source 35 is made up of a light-emitting diode (LED) that emits invisible light that cannot be seen with the naked eye, such as infrared or ultraviolet rays, etc. If no visible light is emitted from the light source 35, there is no need to provide the first filter 36.

The first reflector plate 37 is supported by a lower inclination part 41 of the housing 31 so as to be inclined at a predetermined angle of inclination a with respect to the horizontally provided playfield 7. Further, the second reflector plate 38 is attached at an angle of inclination corresponding to the angle of attachment of the first reflector plate 37.

Since the housing 31 has the lower inclination part 41, the player P can place her/his legs in below the lower inclination part 41 when the player P is seated. As a result, the player P can reach out her/his hand up to the bottom position of the playfield 7 when arranging the cards 6 on the playfield 7, so that the player P can place the cards 6 on and move the cards 6 to anywhere on the entire playfield 7. Further, since infrared (invisible light) having visible light cut off is emitted onto the playfield 7 from the light source 35 inside the hermetically sealed housing 31, the inside of the housing 31 cannot be seen from above the playfield 7.

The cards 6 used for the card game apparatus 1 of this embodiment are made up of cards with multiple kinds of category names classified into multiple categories as shown in unit organizing conditions (data table) 190 of FIG. 6. These categories are made up of, for example, four types as shown in FIG. 6, which are a character card, a machine card, a weapon card, and a custom card. A category name, a card name (such as a name indicating a character, machine, or weapon), and an illustration corresponding to this card name, for example, an illustration of a character that operates a machine constituting a below-described unit in the case of a character card, the illustration of a machine (a robot, fighter, etc.) used for a battle in the case of a machine card, the illustration of a hand weapon (a beam rifle, shield, etc.) in the case of a weapon card, and the illustration of a special weapon other than hand weapons in the case of a custom card, are printed on the top side of each card 6.

In FIG. 6, the character card, which indicates a category name, serves as a card 6 that forms a main play item in the present invention. The machine card, the weapon card, and the custom card, which indicate category names, serve as cards 6 that form sub play items in the present invention. In the present invention, as a preparation step for playing a battle game, the player P first organizes a unit made up of a group of multiple cards 6 including a main play item and a sub play item. Then, the player 6 places the group of cards 6 organizing the unit on the playfield 7, and performs the operation of recording (storing) the specific information (card identification codes) recorded on the bottom sides of the organized cards 6 in the RAM 24 serving as storage means. This unit collectively represents a pilot and a battle machine with a weapon organized by the player P, that is, a character serving as a pilot, a machine ridden by the character, a weapon with which the machine is equipped, etc., in a battle game. The enemy corps also organizes a unit.

Next, unit data creation means described below searches the attribute information pre-recorded in the RAM 24 in correspondence to the card identification codes based on the card identification codes recorded in the RAM 24, creates a data table correlating these card identification codes with the corresponding attribute information as a unit, and stores the data table in the RAM 24.

When the player P organizes the above-described unit from the cards 6 in her/his possession, for example, one character card that is a main play item and one machine card that is a sub play item are always included. Further, while organization of a weapon card and a custom card is optional, unit organizing rules are set, such as setting an upper limit to the total number of cards 6 organizing a single unit, for example, limiting it to five or less. Further, an upper limit of, for example, up to five units, is also set to the number of units to be organized and recorded by the unit organizing rules.

In the play of a game, for example, in a battle scene or the like, the character card that is a main play item constituting this unit serves as an operational play item representing the unit as the pilot of this battle machine. That is, the game progress control program controls the progress of the game so that when the player P moves the character card that is a main play item constituting the unit placed on the playfield 7, the unit represented by the character card plays a battle game with the enemy unit.

Further, with respect to the character card, the machine card, the weapon card, and the custom card shown in FIG. 6, several different kinds of cards 6 can be made in advance for each category and used in a game. For example, with respect to the machine card, a card is made for each machine ridden by the character described in the character card, such as a fighter or a robot. Further, with respect to the weapon card, weapon cards of multiple kinds, of a beam rifle, a shield, etc., are made. Further, the weapon cards of multiple kinds include those with a condition at a weapon use time, such as for the right hand, for the left hand, for either right or left hand, etc. Further, as shown in FIG. 6, a category code for indicating a category type is preset for the cards 6 grouped into each category.

Multiple kinds of cards 6 made for each category are assigned classification codes as shown in data items 191 of FIG. 7. A card identification code represented by these category and classification codes serves as specific information pre-recorded in the card 6. This specific information pre-recorded in the card 6 (card identification code) serves as specific information for identifying each card 6 usable in the game. As described below, this card identification code is printed on the bottom side of the card 6 as, for example, a code pattern that can be expressed by a binary number having a predetermined number of digits. This code pattern is printed with pigment ink that cannot be recognized with the human eye but can be recognized with exposure to invisible light such as infrared. The card identification codes shown in FIG. 7 are indicated by binary numbers made up of eight bits.

Further, in the present invention, with respect to the above-described unit, multiple units can be organized in each game. In the case of organizing multiple units, appropriate unit organizing rules are set in advance, such as using different kinds of character cards for character cards included in respective units on a one-per-unit basis and serving as main play items and allowing the units to use the same card with respect to a card 6 related to a sub play item.

Further, with respect to each card 6, attribute information (such as parameters) indicating the characteristic, performance, and the like of the card is preset. This attribute information is pre-stored in the RAMs 24 of the terminal units 4a through 4h as numerical values or code information along with the card identification code of the corresponding card 6. FIG. 7 shows example data items of this attribute information preset for each card 6. Further, all or part of the attribute information set for each card is printed on the top side or bottom side of the corresponding card 6 so as to be recognizable by the player P.

Of the data items related to the attribute information shown in the data items 191 of FIG. 7, COST is a numerical value for totaling the costs needed to organize one or more units when the player P organizes the units, and a predetermined cost value is set for each card 6. By thus setting a cost value for each card 6, the player P is enabled, when playing a versus game with another player T, to play the game with an upper limit set to the total value of costs with respect to all the organized units. As a result, the game can be played with balance in terms of cost with respect to all the units organized by the players.

Figure 8:
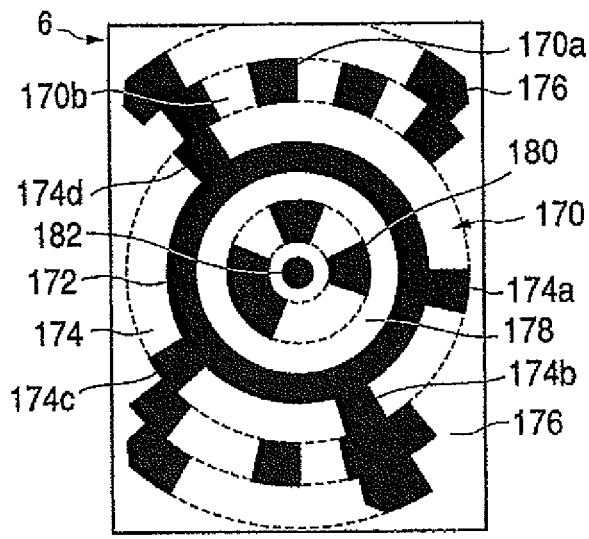
FIG. 8 is a diagram showing a code pattern recorded on the bottom side of the card.

Next, a description is given of a code pattern that is the specific information recorded on the bottom side of the card 6. FIG. 8 shows a code pattern recorded in the card 6. A code pattern 170 made up of multiple patterns with different radii is printed on the bottom side of the card 6. This code pattern 170 has a card position detection circle 172, a position angle detection pattern area 174 formed on and around the card position detection circuit 172, and an ID data area 176 formed outside the position angle detection pattern area 174. Further, the code pattern 170 has an annular white area 178 formed inside the card position detection circle 172, a data area 180 formed inside the annular white area 178, and a central point 182 formed inside the data area 180. The code pattern 170 is recognized by the difference in density between a black part 170a and a white part 170b.

Further, the code pattern 170 is subjected to printing using ink that transmits infrared so as to prevent direct visual recognition by players. Therefore, players or other people are prevented from working on and altering the code pattern 170 or counterfeiting a card after the code pattern 170.

Further, in the code pattern 170, the card position detection circle 172, the position angle detection pattern area 174, the ID data area 176, the annular white area 178, and the data area 180 are formed concentrically about the central point 182. Further, the ID data area 176, whose radius is greater than the shorter side of the card 6, is formed into a shape curved like an arc. That is, in the ID data area 176, part of the outermost circular pattern positioned with a radius greater than the shorter side part is recorded in an arcuate manner with respect to the rectangular card surface. Therefore, it is possible to make effective use of the entire area of the card surface.

Figure 9:
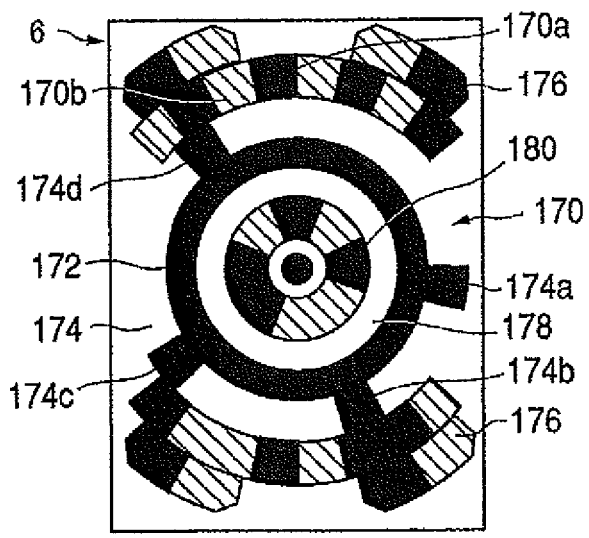
FIG. 9 is a diagram showing an example image in the case of capturing the image of the bottom side of the card with an image sensor.

FIG. 9 is a diagram showing an example image in the case of capturing the image of the bottom side of the card 6 with the image sensor 40. As shown in FIG. 9, when the image of the code pattern 170 is captured with the image sensor 40, a black-and-white part is recognized as "1" and a white-and-black part is recognized as "0." The white parts of the ID data area 176 and the data area 180, which are indicated by hatching, are not blank and represent predetermined information in combination with black parts. That is, the black part and the white part are configured to be extracted as a one-bit signal, and the arrangement pattern of the black and white parts differs in accordance with the contents of predetermined information. This arrangement pattern of the black and white parts functions as a code pattern. In this case, the size is determined so that each half bit (indicating one black part or white part) is six dots on the image of image data captured with the image sensor 40.

The code pattern 170 and the code central point 182 of the card 6 are detected by the difference in luminance between the inside and outside of the card position detection circle 172. Therefore, a white area is annularly formed inside and outside the card position detection circle 172. This clarifies the difference in luminance between the inner circumference and outer circumference of the card position detection circle 172. Since the card position detection circle 172 is a circle, the position can be detected irrespective of the orientation (position angle) of the card 6.

Further, the position angle of the code pattern 170 (the orientation of the card 6) is detected and determined by detecting the circumferential intervals between projecting parts 174a through 174d of the position angle detection pattern area 174, which radially project outward from the outer circumference of the card position detection circle 172. Therefore, the projecting parts 174a through 174d are circumferentially spaced not equally but at different intervals, so that the position angle of the card 6 is determined by detecting the intervals.

Further, the value of each bit is determined by the difference in luminance between two adjacent half-bit areas. In determining the luminance of each area, part of the area on the edge of a border is not used and the luminance of the central part of each area is extracted in order to reduce the effect of defocusing or error at the time of detecting a position or angle.

Figure 10:
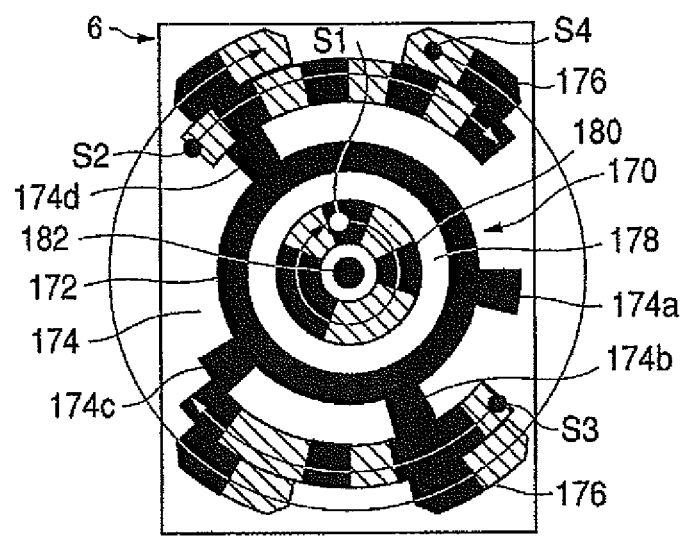
FIG. 10 is a diagram showing bit start positions of an ID data area and a data area recorded on the bottom side of the card.
Figure 11:
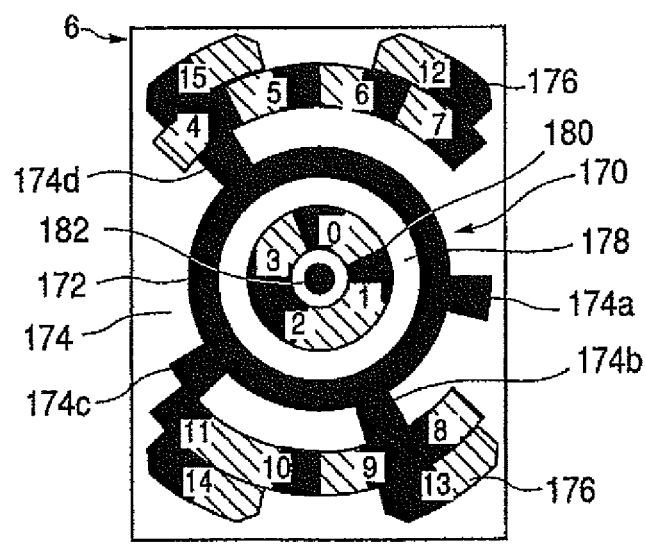
FIG. 11 is a diagram showing the disposition of pattern data recorded on the bottom side of the card.

As shown in FIG. 10, bit start positions S1 through S4 of the ID data area 176 and the data area 180 vary from card 6 to card 6. Further, as shown in FIG. 11, 16-bit information formed of pattern data 0 through 15 is obtained in the ID data area 176 and the data area 180. Further, each of the pattern data 0 through 15 is formed of a black part and a white part as described above. Each of the black and white parts has a large area so as to facilitate its identification from among the image data captured with the image sensor 40, thereby preventing incorrect recognition of data. The above-described card identification code, which is card-specific information assigned to each card 6, is represented in the ID data area 176 and the data area 180.

Figure 12:
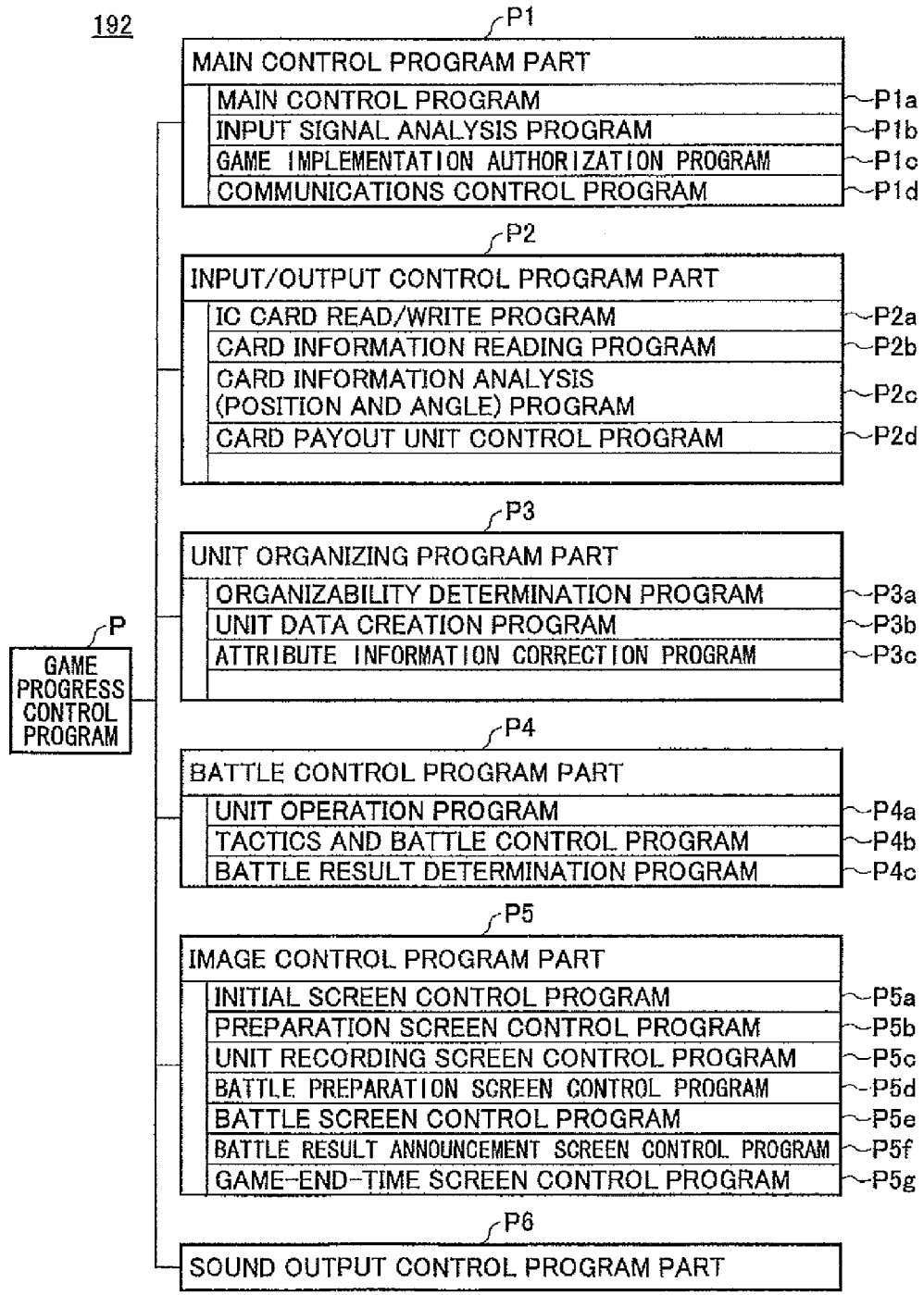
FIG. 12 is a diagram for illustrating a configuration of a game progress control program that controls the operations of a game apparatus of the present invention.

Next, a description is given of a configuration of the software contained in the RAMS 24 of the terminal units 4a through 4h shown in FIG. 1 through FIG. 3 to control the progress of the game of the card game apparatus 1. FIG. 12 is a diagram showing a program configuration 192 of a game progress control program P that controls the game progress of the card game apparatus 1.

As shown in FIG. 12, the game progress control program P is made up of a main control program part P1, an input/output control program part P2, a unit organizing program part P3, a battle control program part P4, an image control program part P5, and a sound output control program part P6.

The main control program part P1 is made up of a program for performing overall control of the operation of the card game apparatus 1 and sub programs necessary for this overall control. The main control program part P1 has sub programs such as a main control program P1a, an input signal analysis program P1b, a game implementation authorization program P1c, a communications control program P1d.

The main control program P1a, which is executed after the card game apparatus 1 (for example, the main control part 3 or the terminal unit 4a) is turned ON, is a program for controlling the overall flow of game progress. The main control program P1a includes a program that initializes a work area in the RAM 24 used for the computation, etc., of the program when the card game apparatus 1 is turned ON. Further, the main control program P1*a* includes an initial screen display program for displaying an initialization screen, for example, a game title, etc., on the display unit 8 serving as display means when power is turned ON. Further, the main control program P1*a* includes a program that makes a request for transmission of image data to be displayed on the display unit 8, the image data being contained in the RAM 17 of the main control part 3, and stores the received image data in the RAM 24 of the terminal unit 4*a*.

The input signal analysis program P1*b* analyzes an input signal (such as an interrupt signal) when the input signal is input from the IC card reader/writer 9, the coin deposition unit 9*a*, the selection buttons 11, the various buttons 12, etc. Further, the input signal analysis program P1*b* is a program that transfers control to a sub program that performs processing corresponding to the input signal. For example, when the player P captures an enemy unit in the attack area and presses the ATTACK EXECUTION button 12 so that its signal is input, the input signal analysis program P1*b* analyzes the kind of the signal. Then, the main control program P1*a* activates a program that displays a battle animation image (object image), and performs control so that an animation image (moving image) that shows fighting conditions is displayed for a predetermined period of time on the display unit 8.

The game implementation authorization program P1*c* counts the number of coins deposited in the coin deposition unit 9*a* by the player P, and stores the number of the deposited coins. That is, the game implementation authorization program P1*c* is a program that performs processing such as determining the number of reserved coins for appropriating the number of deposited coins for a game charge and determining whether the number of reserved coins is sufficient for a game charge (credit) for one game. If it is determined that the number of reserved coins (the number of deposited coins) is sufficient for a game charge for one game, it authorizes implementation of the game.

Otherwise, it causes the number of coins required to be deposited to be displayed on the display unit 8.

The communications control program P1*d* is a program for data communications with the main control part 3 and for the player P performing data communications with one of the other terminal units such as the terminal unit 4*b* to play against the player T who operates the one of the other terminal units such as the terminal unit 4*b*.

The input/output control program P2 is made up of a program that performs predetermined processing based on input signals from the above-described buttons 11 and 12, IC card reader/writer 9, and sensor connected to the input/output interface 25, and a program for controlling the operations of the IC card reader/writer 9, the card payout unit 10, etc.

As shown in FIG. 12, the input/output control program part P2 is an IC card read/write program P2*a*, a card information reading program P2*b*, a card information analysis (position and angle) program P2*c*, and a card payout. The IC card read/write program P2*a* is a program for controlling the operation of the IC card reader/writer 9. This program P2*a* performs processing for authenticating the player P by reading the name or nickname data of the player P contained in the IC card 5 when the player P inserts the IC card 5 of her/his own into the IC card reader/writer 9 at the time of playing a game. Further, the program P2*a* is a program that performs processing such as writing data on battle results, which are game results, in the IC card 5 when one game ends.

The card information reading program P2*b* reads the image data, captured with the image sensor 40, of the code pattern 170 recorded (printed) on the bottom side of the card 6 into the RAM 24 when the player P places the card 6 on the playfield 7 at the time of playing a game. Further, the card information reading program P2*b*, based on these image data stored in the RAM 24, obtains the above-described card identification code by decoding the information represented by the code pattern 170 and stores the obtained card identification code in the RAM 24.

The card information analysis (position and angle) program P2*c* detects a position, angle (orientation), etc., in the coordinate system of the upper surface of the playfield 7 with respect to the card 6 placed on the playfield 7 from the image data stored in the RAM 24 by the above-described card information reading program P2*b*. Of this processing, the detection and determination of the position of the card 6 on the playfield 7 can be performed by calculating the coordinates of the position of the card position detection circle 172 from the two-dimensional image data captured and read into the RAM 24 and converting these coordinates into the coordinate system of the playfield 7. The coordinates of the playfield 7 can be set in the two-dimensional image data read into the RAM 24 by printing marks detectable by the image sensor 40 at the four corners of the playfield 7.

Further, the angle (orientation) of the card 6 on the playfield 7 can be determined by the following processing with the card information analysis (position and angle) program P2*c*. First, the image data of the position angle detection pattern area 174 captured in advance with an orientation to serve as a standard are pre-recorded in the RAM 24 as a standard orientation pattern. Then, the pattern of the projecting parts 174*a* through 174*d* included in the position angle detection pattern area 174 in the above-described image data placed on the playfield 7 by the player F and read into the RAM 24 is compared with this standard orientation pattern by pattern matching. Thereby, the angle (orientation) of the card 6 relative to the coordinate system of the playfield 7 can be determined.

When the player P places a group of multiple cards 6 making up a unit organized by the player P on the playfield 7 and performs the operation of recording the unit as a preparation step before playing a game and when the player P battles against the enemy side, the player P causes a character card constituting the unit to move (sortie) while sliding it on the playfield 7. Then, the above-described card information reading program P2*b* and card information analysis (position and angle) program P2*c* run in accordance with the control of the main control program P1*a*.

The card payout unit control program P2*d* is a program for performing the control of, for example, paying out one new card 6 to the player P at the end of every one game based on the control of the main control program P1*a*. One of the above-described character card, machine card, weapon card, and custom card is paid out at random as this new card 6 paid out at the end of every one game. This newly paid-out card 6 can be used from the next game as a card owned by the player P.

The unit organizing program part P3 is made up of programs that run when the player P places a group of multiple cards 6 making up a unit organized by the player P on the playfield 7 and records the specific information recorded in each of the cards 6 making up the unit in the terminal unit 4*a* as a preparation step for playing a battle game. The unit organizing program part P3 has sub programs such as an organizability determination program P3*a*, a unit data creation program P3*b*, and an attribute information correction program P3*c*.

As described above, in the present invention, the unit organizing rules for the player P organizing a unit are preset. The organizability determination program P3a is a program for checking whether the player P has organized a unit where the combination of a group of cards 6 included therein matches the unit organizing rules.

When the player P organizes a unit, the player P places a group of multiple cards 6 organized by the player P. Then, the code patterns 170 recorded in these cards 6 are read into and stored in the RAM 24 with the above-described card information reading program P2b. Next, card identification codes are obtained by analyzing the code patterns of the cards 6 and are stored in the RAM 24. The organizability determination program P3a reads the category codes of these card identification codes of the cards 6 organizing the unit stored in the RAM 24 and organizability determination data prestored in the RAM 24. Then, based on these data, it determines whether the unit organized by the player P meets the unit organizing rules. FIG. 13 shows an example of the organizability determination data.

Organizability determination data 193 shown in FIG. 13 are a data table that shows a method for determining error with respect to each error number by setting an error number for each of the contents of errors violating the unit organizing rules, and data for determining error. These organizability determination data do not always have to be prestored in the RAM 24. Alternatively, it may be determined whether the unit organizing rules are met by incorporating the step of determining the contents of error with respect to each error number in the organizability determination program P3a. If the player P organizes a unit that is against the unit organizing rules and tries to record the unit, the organizability determination program P3a causes ERROR to be displayed on the display unit 8.

The unit data creation program P3b refers to a card attribute information data table (not graphically illustrated) made up of attribute information corresponding the card identification codes of the cards 6 prestored in the RAM 24 when the player P organizes and records a unit that meets the unit organizing rules. It is a program for creating data serving as one information unit (unit data table) by correlating the attribute information of each of the cards 6 making up the unit with the specific information (card identification code) of the card 6 and storing this unit data table 194 in the RAM 24. FIG. 14 shows a data configuration of this unit data table 194.

The unit data table 194 shown in FIG. 14 shows that the player P has organized two units indicated by unit numbers 1 and 2 and that a unit data table related to these two units is recorded (stored) in the RAM 24. Further, the unit data table 194 shown in FIG. 14 shows that the unit indicated by the unit number 1 is made up of a total of five cards 6, which are a character card for which a card identification code "00000000" is set, a machine card for which a card identification code "0010000" is set, two weapon cards for which card identification codes "0010000" and "00100001," respectively, are set, and a custom card for which a card identification code "00110000" is set. It also shows that the unit indicated by the unit number 2 is made up of a total of three cards 6, which are a character card for which a card identification code "00000001" is set, a machine card for which a card identification code "00010010" is set, and a weapon card for which a card identification code "00100010" is set. Further, each unit data table also contains the attribute information preset in correspondence to each of the cards 6 making up each unit.

The structured data of the unit data table 194 are arranged in a data configuration as shown in FIG. 14, that is, in the order of a unit number, followed by a card identification code, followed by attribute information. Further, the data configuration is such that the cards 6 making up a unit are arranged in the order of a character card, followed by a machine card, followed by a weapon card, followed by a custom card (in order of card identification code). This makes it possible to retrieve and obtain information on the character cards (main play items) and other cards (sub play items) correlated with the unit numbers 1 and 2 by simple program processing at the time of controlling a game such as a battle.

In the present invention, after the player P organizes a unit and performs the operation of recording its unit data table 194 in the RAM 24, the attribute information included in the unit data table 194 is corrected depending on the conditions of the combination of the cards 6 making up the unit. The attribute information correction program P3c performs this processing based on preset attribute information correction rules. For example, if the unit is organized with a machine card and a weapon card, a particular attribute information item of the machine card and a particular attribute information item of the weapon card contained in the unit data table 194 are collated and the value of the particular attribute information item of this weapon card is increased or decreased based on the attribute information correction rules. The above-described attribute information correction rules, which are a data table that shows, with respect to the cards 6 used in the game, information for correcting particular attribute information of a specific card and another card (or other two cards, etc.) constituting a unit when they are combined and parameters of correction, are recorded in the attribute information correction program P3c.

A description is given below of an example of the processing of this attribute information correction program P3c. The attribute information correction program P3c corrects the unit data table 194 stored in the RAM 24 as shown in FIG. 14, referring to the attribute information correction rules. That is, if the attribute information item "WEAPON SUITABILITY" and the attribute information item "MACHINE COMPATIBILITY" of the machine card 6 and the weapon card 6, respectively, organized by the player P match, the attribute value of one or both of the attribute information items "OFFENSIVE POWER" and "HIT PROBABILITY" of this weapon card is increased by a predetermined percentage. For example, if "WEAPON SUITABILITY" of the machine card having the card identification code "0001000" and "MACHINE COMPATIBILITY" of the weapon card having the card identification code "00100000" match, a correction is made as in a post-correction unit data table 195 shown in FIG. 15. That is, correction is performed so as to improve the "HIT PROBABILITY" of the weapon card having the card identification code "0010000" from "40"% to "60"%, and the corrected unit data table 195 is stored in the RAM 24.

Thus, depending on the combination conditions of cards 6 making up each unit, the value of the attribute information of a card 6 constituting the unit is increased or decreased from its value pre-recorded in the card attribute information data table. This enables the player P to organize a unit having higher attribute information (such as offensive power) among the units under her/his command, thus making a game more interesting.

When the operation of recording the unit made up of the group of multiple cards 6 selected by the player P ends, the main control program P1a sets the game control mode of the terminal unit 4a to an "ACTUAL FIGHTING (BATTLE)" mode. The battle control program part P4 is made up of programs that are caused by this to detect the movement, position, and angle on the playfield 7 of a character card serving as the pilot of the unit, control a battle in accordance with the operation of the ATTACK EXECUTION button, determine the result of the battle, and display results at the end of the battle game.

As shown in FIG. 12, the battle control program part P4 has sub programs such as a unit operation program P4a, a tactics and battle control program P4b, and a battle result determination program P4c. These programs such as the unit operation program P4a and the tactics and battle control program P4b serve as means for controlling game execution of a battle game or the like.

When playing a game, the player P places a character card (main play item) serving as an operational play item for operating a unit organized by the player P on the playfield 7. Then, the player P moves this character card on the playfield 7 in a sliding manner in order to attack an enemy unit.

As a result of this, the unit operation program P4a causes the card information reading program P2b and the card information analysis (position and angle) program P2c to operate to detect the position and angle (orientation) of the character card on the playfield 7. Next, the unit operation program P4a, based on these detected data, performs control to convert the position information of the character card in the coordinate system of the playfield 7 into position information in the coordinate system of a battlefield scene to be displayed on the display unit 8 and cause the position of the unit corresponding to the character card (three-dimensional model data corresponding to the card identification code of each of the constituent cards grouped into the unit, such as a machine card and a weapon card) to be displayed on the display unit 8.

Before starting a battle, the player P presses one of the above-described three tactics buttons of "OFFENSE ORIENTED," "MOBILITY ORIENTED," and "DEFENSE ORIENTED" to select tactics. Then, the tactics and battle control program P4b, in accordance with the selected tactics, corrects the parameters, etc., of a calculation formula for calculating damage to be done to the enemy side when the unit attacks the enemy side, defensive power against an attack received from the enemy side, etc. This correction of the damage to be done to the enemy side and defensive power indicates correcting the values of "TRAVELING SPEED," "HIT PROBABILITY," "OFFENSIVE POWER," "HP (HIT POINT)," "DEFENSIVE POWER," etc., of the attribute information shown in FIG. 14 in accordance with a predetermined calculation formula. For example, if the player P selects "OFFENSE ORIENTED," correction is performed so as to increase the values of offense-related attribute information items and to decrease the values of defense-related attribute information items.

Further, the tactics and battle control program P4b also performs control to convert three-dimensional object battle animation image data located in the virtual space contained in the RAM 24 into two-dimensional data and cause them to be displayed on the display unit 8, which is display means, when the player P presses the "ATTACK EXECUTION" button. This object also includes image data corresponding to the character.

The battle result determination program P4c is a program for determining whether the result of a battle is a win or loss. When the player P and the player T battle, whether the result of this battle is a win or loss may be determined by, for example, performing the following processing with this battle result determination program P4c.

(1) If the value of the attribute information item "HP" of a machine card constituting a unit of the player P or player T is reduced to "0" by the attack of the opponent, the unit is destroyed. If the re-sortie cost value is greater than zero, a re-sortie is made, and if the re-sortie cost value is less than or equal to zero, the cost value of the unit is subtracted from the total cost. Then, if the remaining total cost value of either one becomes zero, that is, all the units are annihilated (destroyed) with no possibility of re-sortieing, as a result of the battle game, it is determined at this point that the player on the annihilating side is a winner.

(2) The win/loss determination in the case where neither player has all of her/his units annihilated after playing a battle game for a preset time, for example, three minutes, that is, when the time is up, is made by comparing the cost remaining ratios of the player P and the player T. First, if the re-sortie cost value remains (exceeds zero) for both players, it is determined that the player with a greater remaining re-sortie cost value is a winner. Further, if the re-sortie cost value remains (exceeds zero) for one and is less than or equal to zero for the other, it is determined that the player with a remaining re-sortie cost value is a winner. If the re-sortie cost value does not remain (is less than or equal to zero) for either player, it is determined that the player with a greater total cost value remaining ratio is a winner. The total cost value remaining ratio of the player P is calculated as SKP/Kp, and the total cost value remaining ratio of the player T is calculated as SKt/Kt, where Kp is all the units (the total cost of all the cards 6) recorded by the player P at the start of the game, Kt is all the units (the total cost of all the cards 6) recorded by the player T at the start of the game, and SKP and SKt are the total cost values of the player P and the player T, respectively, remaining when the time is up.

The image control program part P5 is made up of programs for outputting various effect images onto the display unit 8 based on the control of each of the programs of the main control program part P1, the input/output program part P2, the unit organizing program part 3, and the battle control program part P4.

This image control program part P5 has sub programs such as an initial screen control program P5a, a preparation screen control program P5b, a unit recording screen control program P5c, a battle preparation screen control program P5d, a battle screen control program P5e, a battle result announcement screen control program P5f, and a game-end-time screen control program P5g.

The sound output control program P6 is a program for outputting sound from the loudspeaker 30 based on the control of each of the programs of the main control program part P1, the input/output program part P2, the unit organizing program part 3, the battle control program part P4, etc.

The above-described programs can be developed using a programming language such as C. Source programs developed with C are translated into object (machine language) programs executable in the CPU 23, which are stored in the hard disk unit 46 or an external storage of the terminal unit 4a, such as a CD-ROM or DVD-ROM. Further, various image data and sound data are also stored in these computer-readable recording media. When the terminal unit 4a is turned ON, these programs, image data, and sound data stored in the external storage such as the hard disk unit 46 are read into the RAM 24. When these programs are activated, the card game apparatus 1 is ready to implement a game.

A mask ROM that reads electrically-recorded data can be used as the above-described computer-readable recording medium. In the case of using this mask ROM, a control circuit having this mask ROM is formed on the control board of the terminal unit 4a shown in FIG. 3, and the above-described object programs are stored in this mask ROM.

Next, a description is given, based on FIG. 16 through FIG. 19, of means for facilitating the operation of recording a group of multiple cards 6 for organizing a unit and the operation of moving on the playfield 7 a character card that represents the cards 6 making up this unit to serve as a card for operations when the player P plays a game using the card game apparatus 1 of this embodiment.

FIG. 16 is a plan view showing a configuration of a card sleeve 41 that enables multiple selected cards 6 to be inserted thereinto and extracted therefrom in order for the player P to select a group of multiple cards 6 from her/his own cards 6 and organize a unit and to perform the operation of recording this unit. The card sleeve 41, which has a rectangular shape extending horizontally in a plan view, is formed with two thin sheets of vinyl chloride, ABS resin, etc., being stacked. The card sleeve 41 has multiple horizontally-independent bag-shaped pocket parts 42a through 42e provided between these two stacked sheets so as to be connected successively. The number of these pockets parts 42a, etc., provided is equalized with the upper limit value of the number of cards that can make up a single unit.

Each of the pocket parts 42a through 42e is shaped to be slightly larger in size than the card 6 in plan view, and is caused to be rectangular if the planar shape of the card 6 is rectangular, for example. In the card sleeve 41 shown in FIG. 16, in order to form each of the pocket parts 42a through 42e, adhesion parts 43a and 43b, where two sheets are adhered by heat treatment or the like, are formed at three corner parts (the side parts and bottom part) of each of the pocket parts 42a, etc., and opening parts 44a through 44e to serve as the entrances of the pocket parts 42a through 42e, respectively, are formed at one end of the card sleeve 41 along a longitudinal direction. These opening parts 44a through 44e serve as pocket entrances for the player P inserting and extracting the cards 6 selected to organize the unit individually into and from the corresponding pocket parts 42a through 42e.

Figure 17:
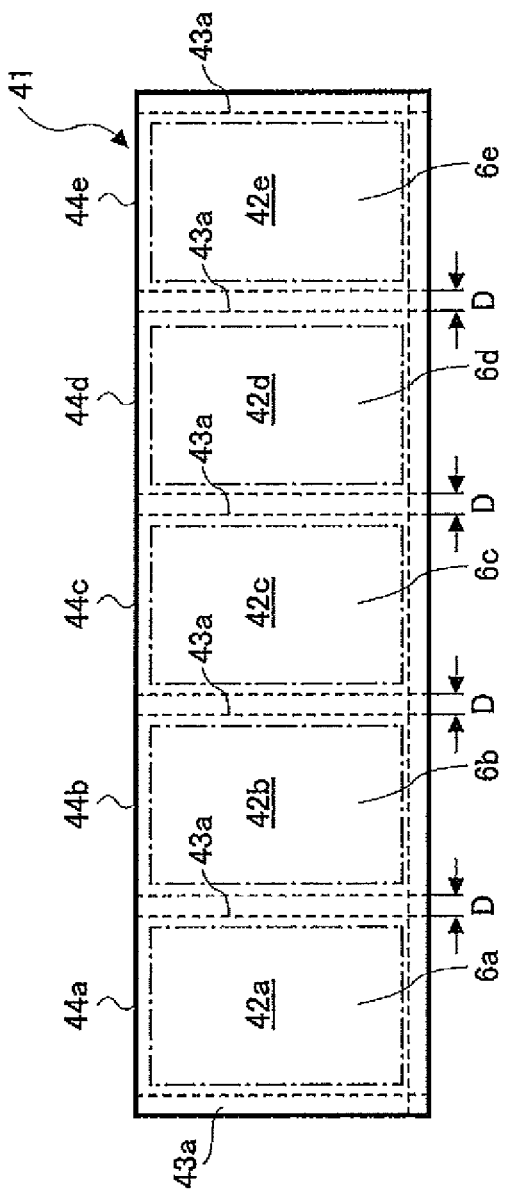
FIG. 17 is a plan view for illustrating the card sleeve shown in FIG. 16 having cards inserted in its pocket parts.

FIG. 17 shows that the cards 6 making up the unit organized by the player P are manually inserted in the corresponding pocket parts 42a through 42e of the card sleeve 41. FIG. 17 shows the case where, by way of example, the player P makes up a unit of five cards 6 and a character card 6a, a machine card 6b, a weapon card 6c, another weapon card 6d, and a custom card 6e are inserted in the pocket part 42a, pocket part 42b, pocket part 42c, pocket part 42d, and pocket part 42e, respectively. The cards 6 are inserted into the corresponding pocket parts 42a through 42e so that their top sides (or bottom sides) face toward the same direction.

With respect to the color of the card sleeve 41, it is desirable that at least a surface of the card sleeve 41 which surface comes into contact with the cards 6 inserted in the pocket parts 42a, etc., be transparent so that the top sides of the cards inserted into the pocket parts 42a, etc., can be externally identified. In the case of reading the specific information recorded on the bottom sides of the cards 6 using infrared light, a surface of the card sleeve 41 which surface comes into contact with the bottom sides of the cards 6 inserted in the pocket parts 42a, etc., may be translucent or colored.

Figure 18:
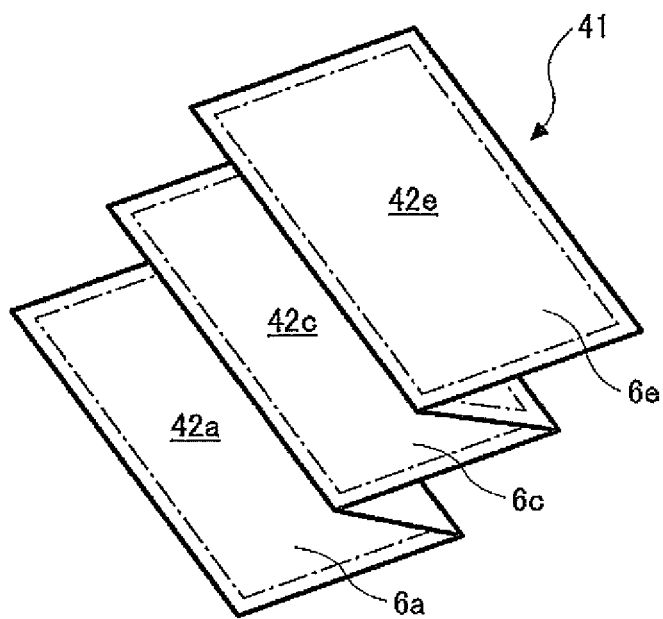
FIG. 18 is a perspective view showing the card sleeve shown in FIG. 1 in the middle of its folding.
Figure 19:
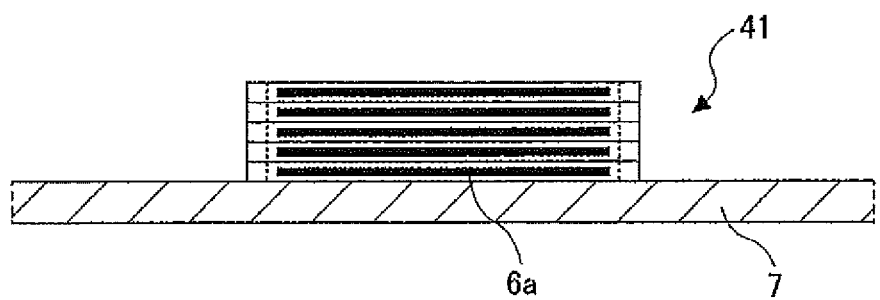
FIG. 19 is a longitudinal sectional view for illustrating the card sleeve shown in FIG. 18 folded and placed on the playfield.

As shown in FIG. 17, the card sleeve 41 having the cards 6 inserted in the corresponding pocket parts 42a through 42e can be folded easily through the adhesion parts 43a, each being provided between the corresponding adjacent pocket parts. That is, the card sleeve 41 having the cards 6 inserted in the corresponding pocket parts can be accordion-folded as shown in FIG. 18 to be into a state where the cards 6 are stacked so that the pocket part having the character card 6a inserted therein is at the bottom as shown in FIG. 19. At this point, folding is performed so that the bottom side of the character card 6a inserted in the lowermost pocket part faces downward from the stacked pocket parts. In thus folding the card sleeve 41, if the width D of each adhesion part 43a provided between the corresponding adjacent pocket parts is properly determined, it is possible to fold the card sleeve 41 so that the pocket part having the character card 6a inserted therein is at the bottom whichever one of the pocket parts 42a through 42e this character card 6a may be inserted into.

Next, a description is given of a game execution method of the card game apparatus 1, which is an embodiment of the present invention, and of the contents of the control of the game progress control program P that controls the progress of this game. When the player P plays a game with the card game apparatus 1 for the first time, the player P is required to purchase a starter pack using a vending machine or the like installed in a game arcade as described above. The starter pack includes the IC card 5 containing an IC chip, multiple cards 6 for each category to be used in the game, two card sleeves 41, etc.

First, the terminal unit 4a is turned ON, and an operation is performed to read the game progress control program P from the hard disk unit 46, where the game progress control program P is contained, into the RAM 24. Next, when the game progress control program P is activated, such processing is executed as initializing the work area of the RAM 24 and transferring, of the image data to be displayed on the display unit 8, those contained in the RAMs 17 or the like of the large panel control parts 15 to the RAM 24 of the terminal unit 4a. Further, the RAMs 17 and 24 contain first storage means for storing usable total cost values that vary from player to player and second storage means for storing a reserve cost value of a certain amount separately from the original total cost value of each player.

Figure 20:
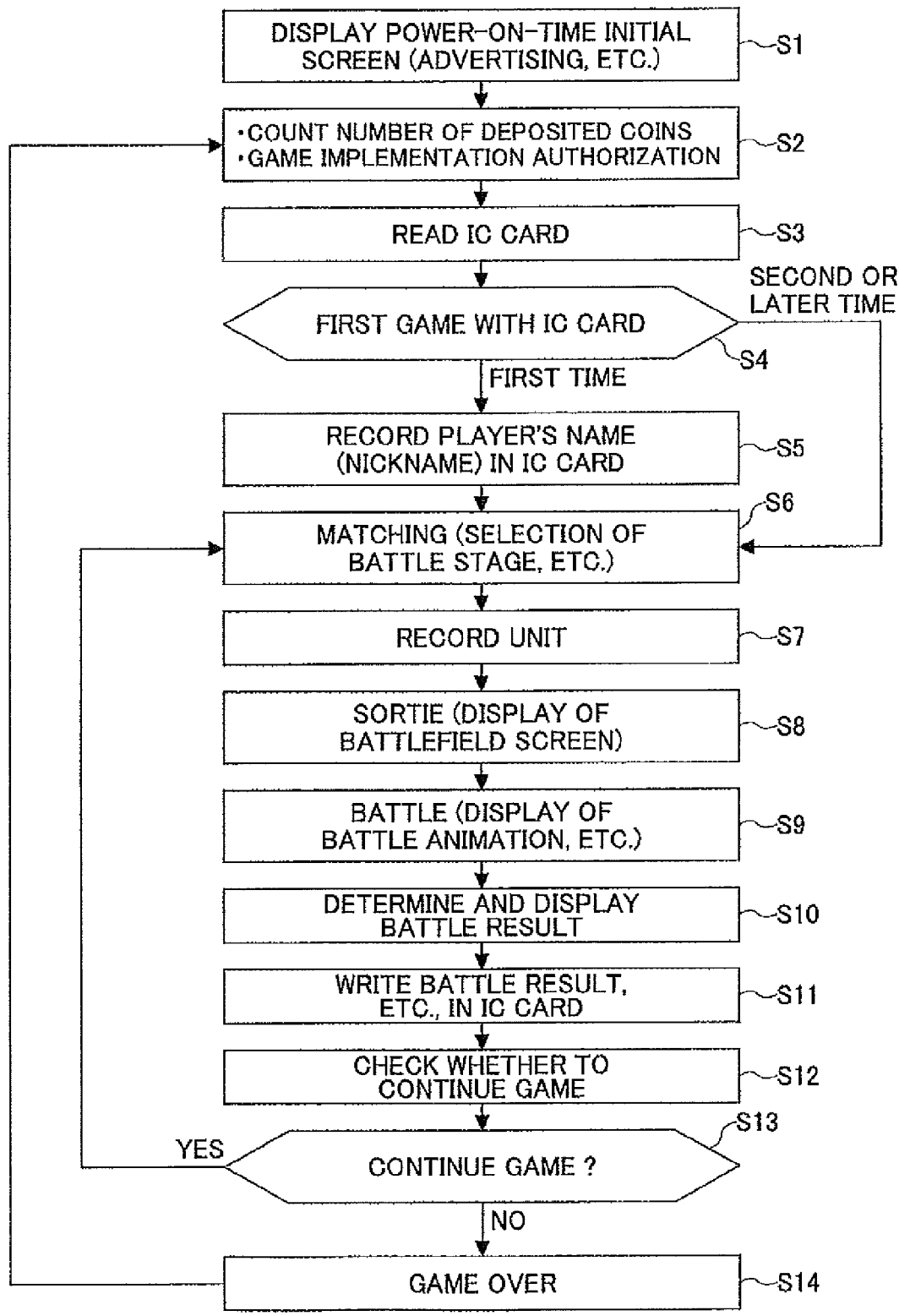
FIG. 20 is a flowchart for illustrating a flow of game control in the game apparatus of the present invention.

Next, the game progress control program P1 controls the progress of a game in accordance with the flowchart shown in FIG. 20. A description is given below, following the steps of the flowchart shown in FIG. 20, of a game execution method and its control.

(Step S1)

The main control program P1a causes the initial screen control program P5a to operate, thereby performing advertising that displays the title of a battle game, the procedure of the game, etc., on the display unit 8. As a result, the card game apparatus 1 enters a wait state to wait for deposition of coins or the like to serve as a charge for the player P playing the game.

(Step S2)

When the player P deposits coins in the coin deposition unit 9a, a coin detection sensor installed in the coin deposition unit 9a detects the deposited coins, and this detection signal is input to the terminal unit 4a through the input/output interface 25. Then, the input signal analysis program P1b of the terminal unit 4a analyzes the kind of this input signal, and in response to determining that it is a coin deposition signal, causes the game implementation authorization program P1c to operate.

The game implementation authorization program P1c counts the number of coins deposited in the coin deposition unit 9a by the player P and stores the number of deposited coins in a storage area set in the RAM 24 as the number of coins reserved, and determines whether the number of deposited coins reserved is sufficient for a credit (for example, three coins) that is a game charge for one game. In response to deposition of a sufficient number of coins to allow implementation of one game, it performs processing to authorize implementation of a game, and causes the preparation screen control program P5b to operate to display a next operational procedure on the display unit 8 to the player P. On the other hand, if the number of coins reserved is not sufficient for a game charge for one game, it urges deposition of necessary coins on the display unit 8.

If the game implementation authorization program P1c determines that the number of reserved coins is sufficient for a credit for one game, the number of coins to serve as a credit for one game to be implemented from now is subtracted from the number of reserved coins stored in the RAM 24, and stores the number of reserved coins obtained by the subtraction in the RAM 24. This updating of the number of reserved coins is processing performed for reserving odd coins for a game charge for the next game when the player P deposits extra coins for a game charge for one game.

(Step S3)

Next, the player P performs the operation of inserting the IC card 5 into the IC card reader/writer (R/W) 9. When an insertion signal of the IC card 5 is input, the main control program P1a causes the IC card read/write program P2a to operate to read the information contained in the IC card 5 and store it in the RAM 24. The IC card 5 contains the name or nickname of the player P, the upper limit of a cost at a time when the player P organizes a unit for playing a battle game, battle results that are the results of playing a battle game, etc.

(Step S4) (Step S5)

In step S4, it is determined by the main control program P1 whether the IC card 5 read in step S3 is an IC card 5 used for the first time. If it is determined that the IC card 5 has been used by the player P for the first time, it proceeds to step S5, where the name or nickname of the player P is entered through interactions with the display unit 8.

(Step S6)

Steps S6 and S7 are steps for preparing for implementation of a battle game. In step S6, the main control program P1a causes the battle preparation screen control program P5b to operate to perform matching processing such as setting the player T to play against the player P and causing a stage at which the game is implemented to be selected through interactions with the large panel displays 2. This stage at which the game is implemented indicates a battle scene where the battle game is played, and for example, the universe, ground, sea or the like is preset. The code of the stage selected by the player P is stored in the RAM 24.

(Step S7)

In step S7, the player P performs the above-described operation of recording a unit. The contents of the operation performed by the player P in this step and the contents of the processing of the game progress control program accompanying this operation are as follows.

(1) First, the player P selects multiple cards 6 from her/his own cards 6 in order to organize the above-described unit. For example, the unit organizing rules that at least one character card and at least one machine card are included while it is optional to organize other weapon and custom cards, and that a total number of cards 6 making up a single unit is less than or equal to five are set for this unit organization.

(2) The player P inserts the cards 6 selected to organize a unit individually into the corresponding pocket parts 42a through 42e of the card sleeve 41 or the like. At this point, the top sides (or bottom sides) of all the cards inserted into the pocket parts 42a through 42e of the card sleeve 41 face toward the same direction.

(3) Next, the player P spreads the card sleeve 41 having the cards 6 making up a single unit inserted therein into a plane, and places it on the playfield 7. At this point, the card sleeve 41 is placed on the playfield 7 so that the bottom sides, that is, the surfaces having the code patterns 170 recorded thereon, of all the cards 6 inserted in the corresponding pocket parts 42a through 42e of the card sleeve 41 are opposed to (face) the upper surface of the playfield 7.

(4) The player P places the card sleeve 41 having the cards 6 making up each unit organized by the player P on the playfield 7, and presses the button 12. As a result, the main control program P1a causes the card information reading program P2b to operate to read the image data captured with the image sensor 40 into the RAM 24. At this point, the code patterns 170 recorded on the bottom sides of the cards 6 are read through the card sleeve 41.

If the player P has organized two or more units, the cards 6 making up the other units are inserted into other corresponding card sleeves 41 prepared separately from the used card sleeve, and all the card sleeves 41 having the corresponding cards 6 inserted therein are placed on the playfield 7. At this point, the card sleeves 41 are placed, for example, horizontally, so as not to be on top of one another on the playfield 7. Thereby, the card information reading program P2b can read image data related to the code patterns 170 recorded on the bottom sides of the cards 6 making up multiple units at a time and store the captured image data in the RAM 24.

(5) Next, the main control program P1a causes the card information analysis (position and angle) program P2c to operate to analyze information related to the code pattern 170 recorded on the bottom side of each card 6. That is, the information related to a card identification code and the position of the card in the coordinate system of the playfield 7 and its orientation is analyzed, and the data obtained by the analysis are stored in the RAM 24. At this point, since a group of cards 6 making up a single unit are inserted into the corresponding pocket parts of the card sleeve 41 to be linearly arranged, the card information analysis (position and angle) program P2c can determine the card identification codes of the cards 6 making up the unit on a unit-by-unit basis by image analysis.

(6) Next, the main control program P1a causes the organizability determination program P3a to operate. First, the organizability determination program P3a determines, with respect to each unit for which the card identification codes have been analyzed, whether the card identification codes corresponding to the code patterns 170 recorded on the bottom sides of the cards 6, analyzed by the above-described processing of (5), are pre-recorded in a card attribute information data table (not graphically illustrated) stored in the RAM 24. If the analyzed card identification codes are recorded in the card attribute information data table, the attribute information recorded in correspondence to the card identification codes in the card attribute information data table are fetched, and are written in a storage area of the RAM 24 where a unit data table is created, being correlated with the corresponding card identification codes. This processing (6) is performed with respect to the analyzed card identification codes of all the units. When this processing (6) ends, the data are rearranged in order of card identification code unit by unit, so that the unit data table 194 having a data configuration as shown in FIG. 14 can be created.

(7) Next, the organizability determination program P3a analyzes the category code included in each of the card identification codes making up the unit data table created in the above-described processing of (6), and determines whether the cards 6 making up this unit meet the preset unit organizing rules. In this determination, the organizability determination program P3a determines whether the unit includes one character card and one machine card, etc., referring to the organizability determination data 193 shown in FIG. 13, etc.

Figure 21:
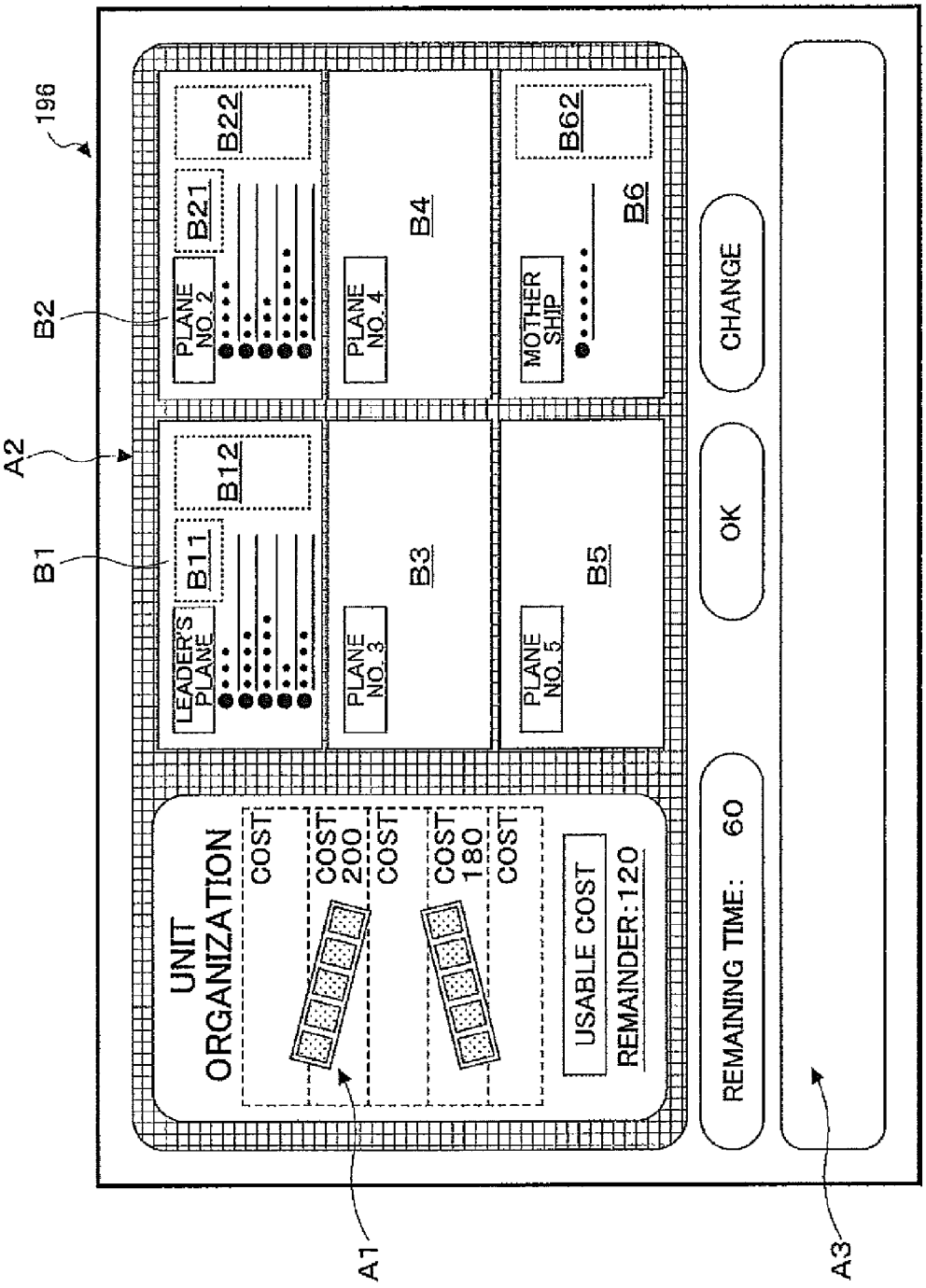
FIG. 21 is a diagram for illustrating a screen displayed on a display unit at the time of performing the operation of organizing and recording a unit.

(8) When the above-described processing of (7) is completed with respect to all the units organized by the player F, the main control program P1a causes the unit recording screen control program P5c to operate to cause a unit recording screen as shown in FIG. 21 to be displayed on the display unit 8. On the unit recording screen shown in FIG. 21, the silhouettes of the card sleeves 41 placed on the playfield 7, the cost value of each unit, and a remaining cost value with respect to the cost value usable by the player P are displayed in a left-side display part A1 of the screen.

Further, six display parts B1 through B6 are provided in a right-side display part A2 of the screen shown in FIG. 21, and the information related to the cards 6 making up a single unit is displayed in each display part. This information related to the cards 6 making up a unit includes the card name of each card, the illustration of the face of a character corresponding to a character card, the three-dimensional object models of a machine corresponding to a machine card and a weapon corresponding to a weapon card, the illustration of a special weapon corresponding to a custom card, etc. These illustrations and models are displayed in display parts B11, B21, B21, B22, . . . .

The example display shown in FIG. 21 shows that the player P has performed the operation of recording two units. The unit placed at the top (the remotest position from the player P in FIG. 2) on the playfield 7 is displayed in the display part 8, which is the left-side uppermost one of the six display parts B1 through B6, as a leader's plane.

Figure 22:
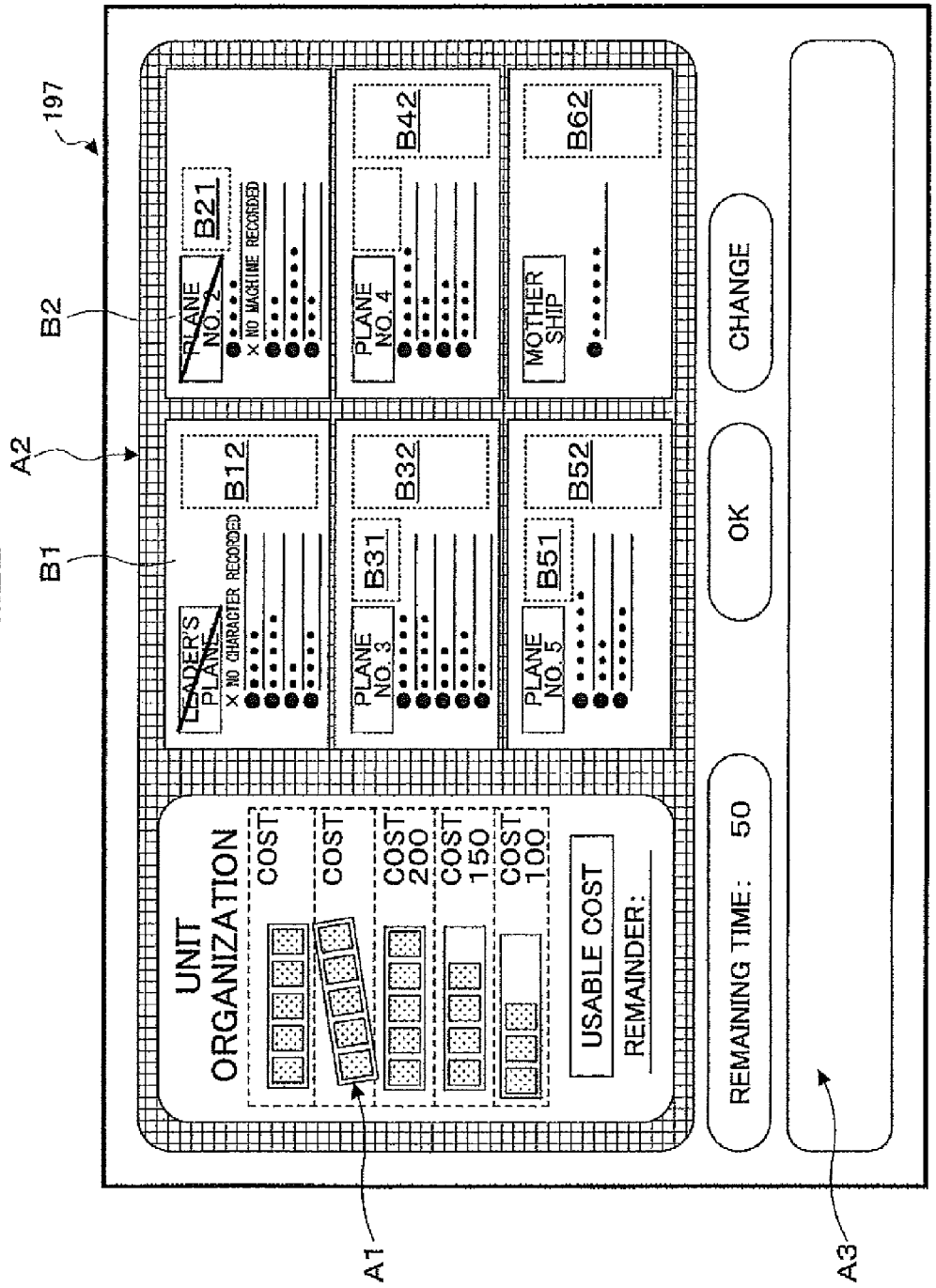
FIG. 22 is a diagram for illustrating another screen displayed on the display unit at the time of organizing and recording the unit.

In the above-described processing of (8), the player P is notified of the occurrence of an organization error when the unit recording screen 196 shown in FIG. 21 is displayed, if a unit that is against the unit organizing rules has been organized. Therefore, the occurrence of the organization error is clearly indicated with color within a display frame where the information related to each unit is displayed, and the contents of the occurrence of the organization error are displayed in a comment display part A3 set at the bottom of the display screen. For example, the method of displaying this occurrence of an organization error clearly indicates the occurrence of the organization error by displaying a bold red oblique line in an area for displaying a unit name (such as a leader's plane or a plane No. 2) in each display frame as in a unit recording screen 197 shown in FIG. 22. If a unit organization error occurs, the player P re-organizes units, and performs the operation of re-recording.

(9) When the player P finishes the operation of recording units that meet the unit organizing rules, the unit data creation program P3b creates the unit data table 194 as shown in FIG. 14, and stores it in the RAM 24. Next, the attribute information correction program P3c operates to check the contents of a specific attribute information item of each of the cards 6 making up the units and correct the value of the attribute information item.

This correction of the value of the attribute information, when a unit is organized with a machine card and a weapon card, collates a particular attribute information item of the machine card and a particular attribute information item of the weapon card in the card attribute information data table (or the unit data table 194) prestored in the RAM 24, and increases or decreases the value of the particular attribute information item of this weapon card in accordance with the attribute information correction rules as described above. When the above-described processing ends, the processing of step S7 ends.

(Step S8)

Next, the player P folds the card sleeve 41 having the cards 6 making up the corresponding unit inserted therein so that the cards 6 are on top of one another as shown in FIG. 19, and places it on the playfield 7. At this point, the card sleeve 41 is folded so that its pocket part in which the character card 6a is inserted is at the bottom, and is placed so that the bottom side of this character card 6a, that is, the surface thereof on which the code pattern 170 related to the identification code of this card is recorded, faces the upper surface of the playfield 7. Next, when the player P presses the action button 12, the main control program P1 sets game control to a sortie mode. At this point, the player P may extract the character card 6a from the card sleeve 41 and place only this character card 6a on the playfield 7. As a result, with respect to the unit organized by the player P, it is possible to control the progress of the game with the character card 6a serving as the operational play item of this unit.

When the game control enters the sortie mode, the main control program P1 causes the unit operation program P4a to operate. The unit operation program P4a causes the card information reading program P2b and the card information analysis (position and angle) program P2c to operate. As a result, a position, orientation, and movement in the coordinate system of the playfield 7 are detected with respect to the character card 6a placed on the playfield 7 and serving as an operational play item, and the battle preparation screen control program P5d is caused to operate to display a screen 198 showing a battlefield situation as shown in FIG. 23 on the display unit 8 in real time.

Thus, in the sortie mode of the game control mode, the player P moves the character card 6a on the playfield 7 in a sliding manner. As a result, the three-dimensional object model of the machine card 6b ridden by the character of the character card 6a is converted into the coordinate system of the screen 198 of the display unit 8 showing this battlefield situation, and is displayed so as to move in synchronization with the movement of the character card 6a. At this point, the illustration and the three-dimensional object model of the character card 6 included in the unit organized by the player T playing against the player P are also displayed on the display unit 8 of the player P through data communications from the terminal unit operated by the enemy player T. As a result, a real-time battle simulation game can be played between the player P and the player T serving as the enemy.

Figure 23:
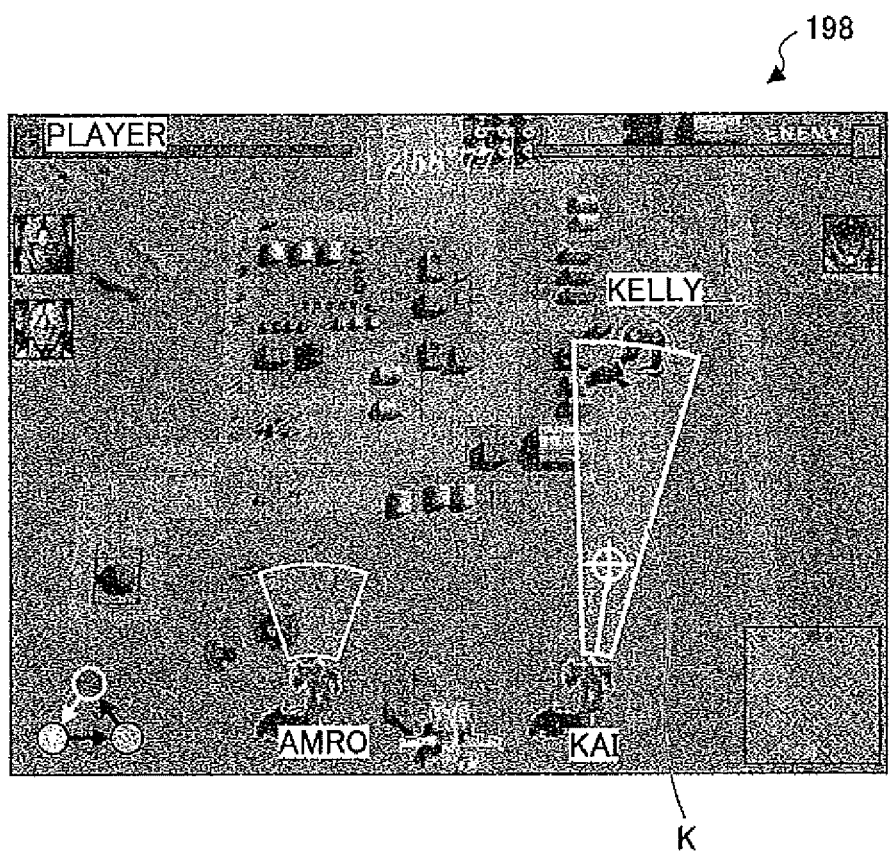
FIG. 23 is a diagram showing a screen displayed on the display unit during a game.

If the cards 6 making up the unit include a weapon card, the battle preparation screen control program P5d performs processing such as graphically displaying the attack range of this machine card or weapon card on the screen 198 indicating a battlefield situation shown in FIG. 23 based on its value of the attack range that is attribute information. This attack range can be displayed based on the data related to "ATTACK RANGE" that is an attribute information item of a weapon card shown in FIG. 14 (FIG. 15). This attack range is displayed in a sectorial shape K on the screen 198 shown in FIG. 23. Further, when the player P moves (or also changes the moving direction of or rotates) the character card 6a on the playfield 7 in a sliding manner, a three-dimensional object model corresponding to the unit correlated with this character card 6a is also displayed on the screen of the battlefield in real time along with the attack range of the sectorial shape K in a moving manner.

Then, if a three-dimensional object model corresponding to an enemy unit is captured in this attack range for which the sectorial shape K or the like is displayed for a predetermined period of time or so, the tactics and battle control program P4b displays a sight having a circular shape or the like for attacking enemy machines so that it approaches the three-dimensional object model of the unit operated by the opponent player T from the three-dimensional object model of the unit operated by the player P. Then, if the tactics and battle control program P4b determines that the sight is in complete alignment with the three-dimensional object model of the opponent, it shows readiness for attacks on the display unit 8, and further outputs sound from the loudspeaker 30. As a result, the player P can attack the enemy machine by pressing the ATTACK EXECUTION button 12.

(Step S9)

If the player P determines that the enemy unit is captured in the sight displayed at the end of this attack range of the sectorial shape K or the like, the player P presses the ATTACK EXECUTION button 12 to launch an attack on the enemy unit. In response to detection of a press signal of this ATTACK EXECUTION button 12, the main control program P1*a* sets the game control in a battle mode. When the game is set in the battle mode, the main control program P1*a* causes the battle screen control program P5*e* to operate. As a result, the three-dimensional battle animation (three-dimensional object) image data contained in the RAM 24 are converted into two-dimensional image data, so that a battle animation screen is displayed on the display unit 8 for a predetermined period of time.

Thus, the battle animation of the unit of the player P and the enemy unit is displayed. The player presses the ATTACK EXECUTION button when the coordinates of the sight set at the end of the attack range displayed on a battlefield screen coincides with the coordinate position of an enemy machine.

As a result, the tactics and battle control program P4*b* reduces the attribute information item "HP" of the enemy machine based on a predetermined calculation formula. If this "HP" becomes "0," the program P4*b* determines that the enemy unit has been destroyed. Then, if a re-sortie cost value is greater than zero, the program P4*b* subtracts the cost value of this enemy unit from the re-sortie cost value and causes the enemy unit to re-sortie. Further, if the re-sortie cost value is less than or equal to zero, the program P4*b* subtracts the cost value of this enemy unit from the total cost value.

(Step S10)

With respect to the battle between the player P and the player T done in the battle step S9, the battle result determination program P4*c* determines the win/loss of the game by performing processing (1) or (2) described below. Then, the program P4*c* causes the battle result announcement screen display program P5*f* to operate to display the result of this battle game on the large panel displays 2 and the display unit 8.

(1) With respect to the total cost of the units organized by each of the player P and the player T, its remaining cost is calculated. Then, if all the units of the player P or the player T are annihilated (destroyed) with no possibility of re-sortieing, that is, its remaining total cost value is "0," it is determined at this point that the player on the annihilating side is a winner.

(2) if neither player has all of her/his units annihilated after playing a battle game for a preset time, for example, three minutes, that is, when the time is up, it is determined that one of the player P and the player T with a greater cost remaining ratio is a winner.

(Step S11)

Because of the termination of one game, the main control program P1*a* causes the IC card read/write program P2*a* to operate to write the battle result data of the latest battle game in the IC card 5 of the player P. Further, if the player P has recorded battle result data that meet preset requirements, the program P1*a* stages promotion in rank or honoring for distinguished services in battle. Next, the program P1*a* also increases and stores the upper limit of the cost usable for one game contained in the IC card 5 of the player P. Next, the main control program P1*a* causes the card payout unit control program P2*d* to operate to pay out a new card 6 to the player P.

(Step S12)

The main control program P1*a* causes the game-end-time screen control program P5*g* to operate to display a screen for asking the player P whether to go on to play the next one game on the display unit 8. The player P operates the selection buttons 11 and the action button 12 to perform the operation of entering whether to go on to play the next one game through interactions with this screen display.

(Step S13) (Step S14)

The main control program P1*a* determines the information the player P has entered in above-described step S12 as to whether to go on to the next one game. If the player P has entered that the player P will continue to play the game, the main control program P1*a* returns the control of game progress to above-described step S6, and controls the progress of the next game. On the other hand, if the player P has entered that the player P will not play the next game, the main control program P1*a* returns the control of game progress to above-described step S2.

Figure 24A:
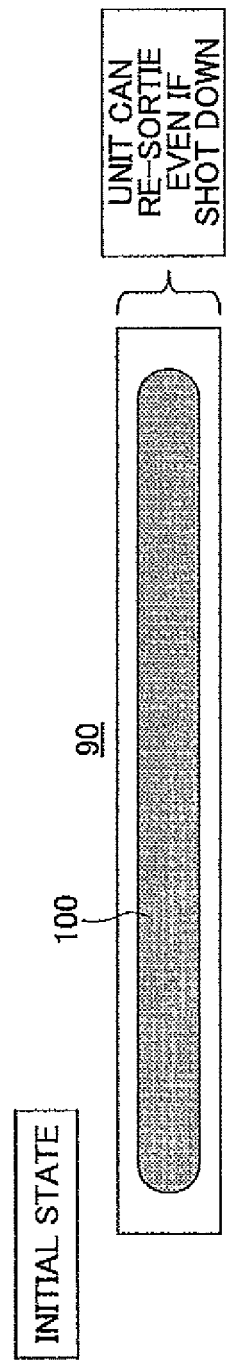
FIG. 24A is a diagram showing a display of a cost gauge 90 in an initial state.
Figure 24B:
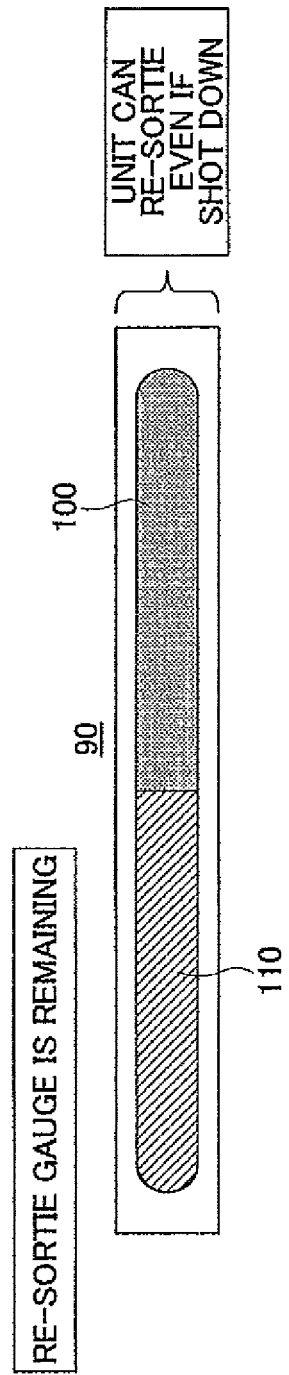
FIG. 24B is a diagram showing a display of the cost gauge 90 where a re-sortie gauge remains.

FIG. 24A is a diagram showing an example display of the initial state of a cost gauge 90. FIG. 24B is a diagram showing an example display of the state where the re-sortie gauge of the cost gauge 90 remains. FIG. 24C is a diagram showing an example display of the state where the re-sortie gauge of the cost gauge 90 has disappeared.

As shown in FIG. 24A, at the beginning of the game, a re-sortie gauge 100 is displayed in the cost gauge 90 displayed on the display unit 8. This re-sortie gauge 100 is displayed in, for example, a horizontal blue bar, and indicates the reserve cost given to the player at the time with its overall length. This reserve cost is a predetermined numerical value, and is given equally to each player. Accordingly, the same reserve cost is automatically given irrespective of whether the player is experienced or a beginner.

As shown in FIG. 24B, for example, if a versus game starts and a player's own unit is attacked by an opponent unit and destroyed, the display length is reduced by subtracting the cost value of the destroyed unit from the re-sortie gauge 100. For example, if the reserve cost of the re-sortie gauge 100 is initially 400 and the cost value of the destroyed unit is 200, the re-sortie gauge 100 is displayed in half its overall length. The re-sortie gauge 100 is displayed on the right side, and part of a power gauge 110 is displayed on the left side on the same line. The power gauge 110 indicates a total cost value made up of the sum of the cost values of the units disposed on the playfield 7.

While the remaining level of the re-sortie gauge 100 is being displayed, control is performed so as to cause the destroyed unit to sortie again. In the conventional system, in the case of a beginner player who can use only low-cost units, the units are defeated one by one in a relatively short period of time because of the difference in performance between units so that it is not possible to fully enjoy a game. However, according to this method, a low-cost unit can sortie multiple times, so that it is possible to enjoy a one-game period more. Further, it is often the case that an experienced player possesses many cards 6 including a character card of a higher cost. In this case, as a result of the generation of an advantage in daring to use a low-cost unit, the tactics of a versus game become more sophisticated, thus increasing options because of the strategic characteristics of organizing cards 6 at the time of a match-up so as to further increase the strategic latitude of the game and the strategic characteristics of unit organizing.

As shown in FIG. 24C, when the player's own unit is further attacked by the opponent unit and destroyed so that the re-sortie gauge 100 becomes empty and reaches zero, the power gauge 110 is displayed in the cost gauge. The power gauge 110 is displayed on the right side in the cost gauge, and a minus amount 120 with respect to the power gauge 110 is displayed on the left side of the cost gauge on the same line.

Figure 25:
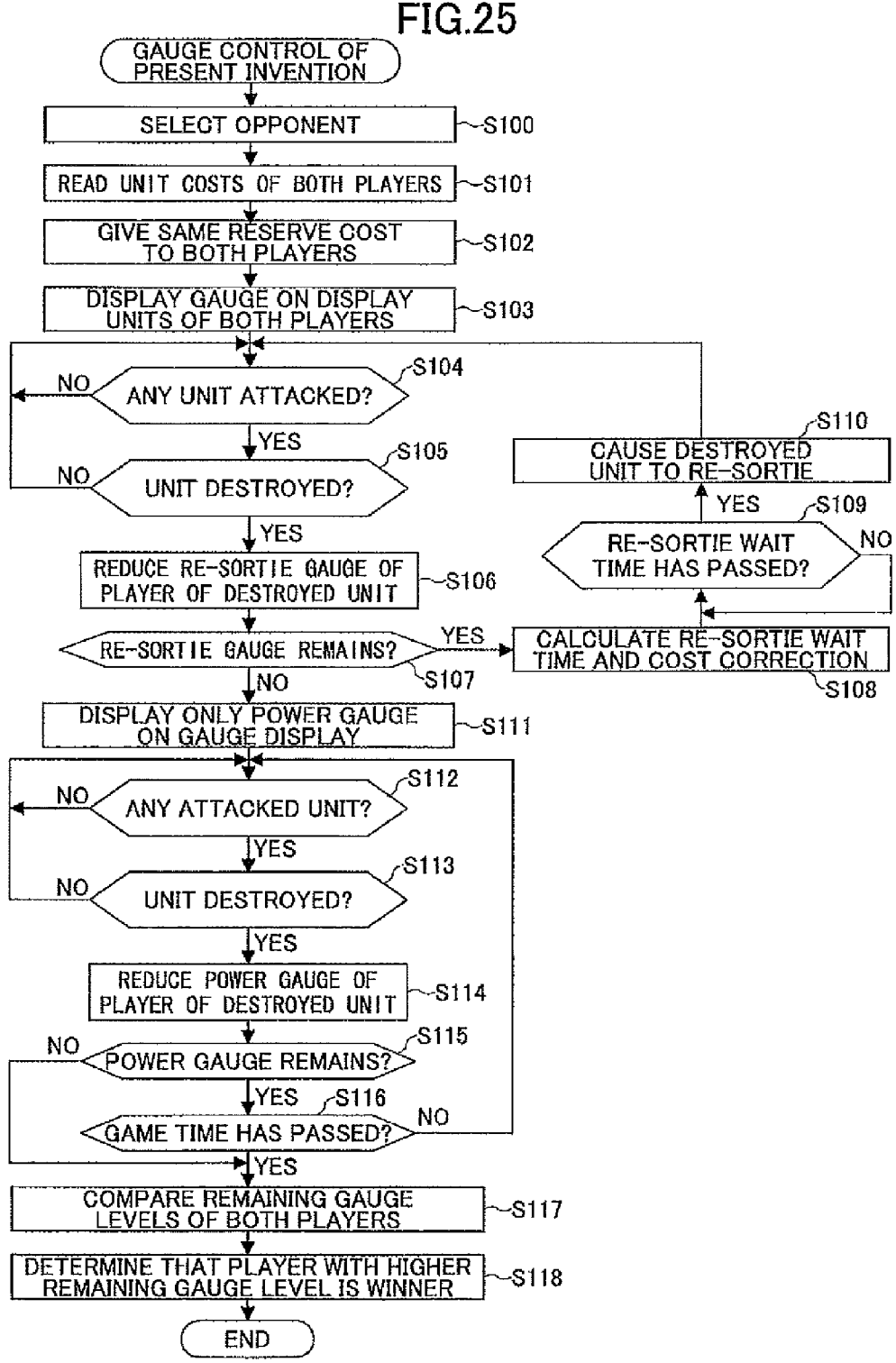
FIG. 25 is a flowchart showing a processing procedure of a cost gauge control method.

FIG. 25 is a flowchart showing a processing procedure of a cost gauge control method. A description is given below, with reference to FIG. 25, of the cost gauge control method. The cost gauge control method is executed in parallel with the above-described control processing shown in FIG. 20.

(Step S100)

First, game pairing is determined by selecting an opponent from the terminal units 4a through 4h each having units disposed on the playfield 7.

(Step S101)

Next, each of selected players A and B reads the cost value of each unit disposed on the playfield 7. Then, the total cost value of each player is calculated by adding up the cost values of the units disposed on the playfield 7.

(Step S102)

The same predetermined re-sortie cost value (reserve cost) (for example, 400) is given to each of the players A and B. This re-sortie cost value (reserve cost) corresponds to the above-described re-sortie gauge 100, and is given to the players A and B equally.

(Step S103)

Next, the cost gauge 90 (see FIG. 24A) is displayed on the display unit 8 of each of the players A and B. Each of the players A and B gives consideration to organization of a fighting force and each unit based on the lengths of the re-sortie gauge 100 and the power gauge 110 displayed in this cost gauge 90. The players A and B can replace a unit with another unit or add another unit by checking the cost gauge 90 before the start of a battle. For example, in the case of destruction of a high-cost unit, there is a disadvantage in that a large amount of the re-sortie cost value (reserve cost) is consumed. Therefore, if the players A and B use high-cost cards 6 so as to avoid the disadvantage of running out of time with each other's "re-sortie gauge" remaining, a strong unit can be handled while there is an increased possibility of a larger gauge reduction, thus resulting in a high-risk-high-return game. Further, in the case of using a high-cost unit, the win/loss determination may be adversely affected depending on the amount of gauge consumption when the time runs out in the match between players of the same level. Therefore, more consideration is given to sophistication of strategic characteristics. Further, since use of a low-cost unit increases the number of re-sorties, a beginner with only a low-cost unit also has an advantage, and reductions in the re-sortie gauge and the power gauge at the time of being shot down are smaller. Therefore, players can be provided with high strategic characteristics in the case of using multiple units in combination as well.

(Step S104)

After the start of the game, it is checked whether there is an attacked unit.

(Step S105)

If there is an attacked unit, it is checked whether the unit has been destroyed. If the unit has been merely damaged (short of being shot down), it returns to step S104 described above.

(Step S106)

If the unit has been destroyed, the cost value of the unit is subtracted from the re-sortie gauge 100 of the corresponding player. The re-sortie gauge 100 is displayed with its display length being shortened for the subtracted cost (see FIG. 24B).

(Step S107)

It is checked whether the cost of the re-sortie gauge 100 remains. If the re-sortie gauge 100 is displayed at this point, the re-sortie cost value (reserve cost) still remains, so that it is determined that it is possible to make a re-sortie.

(Step S108)

If the cost of the re-sortie gauge 100 remains in step S108, the HP (HIT POINT) of the re-sortieing unit is corrected, and a re-sortie wait time is computed. This HP (HIT POINT) correction computes the cost of the re-sortieing unit in accordance with the cost of each unit disposed on the playfield 7 and a remaining amount of the re-sortie cost value based on the following computing equations (1) through (3). The computing equation (1) is a computing equation in the case without a pilot escape system. The computing equations (2) and (3) are computing equations in the case with a pilot escape system.

$$\text{HP AFTER RE-SORTIE} = \text{MACHINE MAXIMUM HP} \times \{\text{MINIMUM GUARANTEE RATIO} + (1 - \text{MINIMUM GUARANTEE RATIO}) \times \text{RE-SORTIE GAUGE REMAINING LEVEL} \div \text{UNIT-RECORDING-TIME COST}\} \quad (1)$$

* In the case of a machine with an escape system, HP is reduced using the following calculation formulas.

$$\text{HP AFTER RE-SORTIE} = \text{MACHINE MAXIMUM HP} \times \{\text{MINIMUM GUARANTEE RATIO} + (1 - \text{MINIMUM GUARANTEE RATIO}) \times \text{RE-SORTIE GAUGE REMAINING LEVEL} \div \text{UNIT-RECORDING-TIME COST} \div 2\} \quad (2)$$

$$\text{HP AFTER ESCAPE} = \text{ESCAPED MACHINE MAXIMUM HP} \times \{\text{MINIMUM GUARANTEE RATIO} + (1 - \text{MINIMUM GUARANTEE RATIO}) \times \text{RE-SORTIE GAUGE REMAINING LEVEL} \div \text{UNIT-RECORDING-TIME COST} \div 2\} \quad (3)$$

According to these computing equations (1) through (3), the HP (HIT POINT) of the unit that has re-sortied can be corrected with a formula including predetermined penalty coefficients (a minimum guarantee ratio and a ratio to the remaining level of the re-sortie gauge) so as to be discounted as the re-sortie cost value decreases. This prevents a player with a large number of units disposed on the playfield 7 or a player with a high total cost from being favored one-sidedly by re-sortieing in the game. Thereby, the disparity between players due to a cost difference is reduced.

Further, the re-sortie wait time is computed based on the following computing equation (4).

$$\text{TIME BEFORE RE-SORTIE (INITIAL VALUE)} + \text{UNIT COST} \times \text{TIME COEFFICIENT BEFORE RE-SORTIE} + \text{NUMBER OF RE-SORTIES OF UNIT} \times \text{EXTENDED TIME BASED ON NUMBER OF RE-SORTIES} = \text{UNIT COMEBACK TIME} \quad (4)$$

According to this computing equation (4), the time for re-sortieing is calculated by adding the product of the unit cost and a time coefficient and the product of the number of re-sorties of the unit and an extended time to an initial value. Accordingly, since the re-sortie wait time becomes longer as the number of re-sorties increases and the time becomes longer as the cost of the unit is higher, computation is performed so as to prevent one-sided favoring by re-sortieing. If the unit is destroyed, the re-sortie wait time is displayed on the display unit 8 so that the player is notified of it.

(Step S109)

It is determined based on the above-described computing equation (4) whether the computed re-sortie wait time has elapsed.

(Step S110)

If the re-sortie time has elapsed since the destruction of the unit, the unit is caused to re-sortie into the virtual space of the game so that the battle (game) continues.

(Step S111)

If no cost of the re-sortie gauge 100 remains in step S107, only the power gauge 110 is displayed in the cost gauge 90 (see FIG. 24C). This state with only the power gauge 110 is based on the total cost of the units disposed on the playfield 7 by the player, and the game progresses under the conditions set by the original combination of the cards 6.

(Step S112)

It is checked whether there is an attacked unit in the state with only the power gauge 110.

(Step S113)

If there is an attacked unit, it is checked whether the unit has been destroyed. If the unit has been merely damaged (short of being shot down), it returns to step S112.

(Step S114)

If the unit has been destroyed, the cost value of the unit is subtracted from the power gauge 110 of the corresponding player.

(Step S115)

It is checked whether the cost of the power gauge 110 remains.

(Step S116)

If the cost of the power gauge 110 remains, it is checked whether a preset game time (a limited period of time for which the game is playable) has elapsed. If the game time has not elapsed, it returns to step S112 and the game progresses repeating the processing of and after step S112.

(Step S117)

If the cost of the power gauge 110 of one of the players becomes zero in step S115 described above, or if the game time has elapsed in step S116, the game is over, and the remaining levels of the cost gauges 90 of both players are compared.

(Step S118)

It is determined based on the result of the comparison of the remaining levels of the cost gauges 90 of both players that the player with a higher gauge remaining level is a winner.

Thus, in the case where the cost of the re-sortie gauge 100 remains, that is, if there is a re-sortie cost value, it is possible to cause a character destroyed by an attack to re-sortie into a virtual space. Therefore, if the character of a beginner is destroyed, it is possible to cause the same character to re-enter the game, and for example, in the case of a character of a low cost value, it is possible to eliminate the dissatisfaction of the beginner by increasing the number of re-sorties per game.

Further, the re-sortie gauge 100 or the power gauge 110 corresponding to the total cost or re-sortie cost value changed by subtraction is selectively displayed in the cost gauge 90. As a result, the player can enjoy herself/himself by making a switch of moods such as letting the time before the gauge of the re-sortie cost value becomes zero be a preparation period for getting familiar with the game, and participating in the game in earnest after the gauge of the re-sortie cost value becomes zero and the gauge of the total cost is displayed.

Further, since the cost value of the unit that has re-sortied is corrected with a computing equation including a predetermined penalty coefficient so as to be discounted as the re-sortie cost value decreases, it is possible to prevent a unit of a high cost value from re-sortieing as it is, and by reducing the disparity between players, it is possible increase the satisfaction of each player.

Further, the time for re-sortieing is computed in accordance with the number of units remaining at the time of a re-sortie, and if the number of remaining units is more than that of the opponent, the re-sortie wait time is extended in proportion to the cost value of a re-sortieing unit, thereby preventing a strong player from having a runaway victory by re-sortieing and thus making it possible to reduce the disparity between a beginner and an experienced player.

Further, the total cost set on a player-by-player basis is a value determined by the number of times the player wins a game. Therefore, by providing a disparity between the total costs of players as a result of winning a game, it is possible for the players to have an increased sense of purpose with respect to winning and losing and enjoy game operations such as organizing and disposing units.

FIG. 26 is a diagram showing an example 1 of the game progress of a re-sortie. As shown in FIG. 26, a re-sortie example 200 assumes the case of making it a condition to be set with a Player A organization cost of 500, a re-sortie cost of 400, a Unit A1 cost of 300, and a Unit A2 cost of 200. If Unit A1 or B1 is shot down (destroyed), a re-sortie can be made up to three times, and no re-sortie is made for the fourth time because the remaining level of the re-sortie gauge 100 becomes zero.

FIG. 27 is a diagram showing an example 2 of the game progress of a re-sortie. As shown in FIG. 27, a re-sortie example 210 assumes the case of making it a condition to be set with a Player B organization cost of 1000, a re-sortie cost of 400, a Unit B1 cost of 500, a Unit B2 cost of 400, and a Unit B3 cost of 100. If Unit B1 of a high cost (500) is shot down among three Units B1, B2, and B3, the penalty coefficient becomes 0.8 and the remaining level of the re-sortie gauge 100 becomes zero, so that no re-sortie is made. Further, in the case where Unit B3 of a low cost (100) is shot down, it is possible to make a re-sortie because the remaining level of the re-sortie gauge 100 is 75%.

FIG. 28 is a diagram showing the progress of a game based on the combinations of the cost values of units in the case where Players A and B meet and A (beginner) wins. A cost setting example 220 shown in FIG. 28 assumes the case of making it a condition to be set with a Player A organization cost of 500, a re-sortie cost of 400, a Unit A1 cost of 300, a Unit A2 cost of 200, a Player B organization cost of 1000, a re-sortie cost of 400, a Unit B1 cost of 500, a Unit B2 cost of 400, and a Unit B3 cost of 100. According to the conventional control method based on this condition, the experienced side rich in card assets (her/his own unit cards) has an advantage. Further, in the case of a trading-card-type game, it is desirable at the beginning of its introduction because it is easy to understand the difference in fighting force. However, there is a problem in that it is difficult for a player that does not have cards to join the game later in the spread period after introduction.

On the other hand, according to the control method of the present invention, although the side richer in card assets (her/his own unit cards) has an advantage, a beginner also has more chances to win depending on how operations are planned. Further, in the case of a trading-card-type game, this serves as a remedy for beginners even in the spread period after introduction, and highly strategic characteristics can be provided through a wider range of options in strategic development in the case of experienced players against each other as well.

FIG. 29 is a diagram showing the progress of a game based on the combinations of the cost values of units in the case where Players A and B meet and B (experienced player) wins. A cost setting example 230 shown in FIG. 29 assumes the case of making it a condition to be set with a Player A organization cost of 500, a re-sortie cost of 400, a Unit A1 cost of 300, a Unit A2 cost of 200, a Player B organization cost of 1000, a re-sortie cost of 400, a Unit B1 cost of 500, a Unit B2 cost of 400, and a Unit B3 cost of 100.

According to the conventional control method based on this condition, the experienced side rich in card assets (her/his own unit cards) has an advantage. Further, in the case of a trading-card-type game, it is desirable at the beginning of its introduction because it is easy to understand the difference in fighting force. However, there is a problem in that particular tactics are likely to become stereotyped among experienced players having many high-cost units in the spread period after introduction.

On the other hand, according to the control method of the present invention, in the case of a trading-card-type game, highly strategic characteristics can be provided through a wider range of options in strategic development, such as "daring to use a weak, low-cost unit" or "using her/his low-cost machine as bait to target a high-cost machine of the opponent," in the case of experienced players against each other in the spread period after introduction.

In the above-described embodiment of the present invention, a description is given of the method where a player, when performing the operation of recording information related to a group of cards 6 making up a unit, inserts the cards 6 making up the unit into the pocket parts 42a, etc., of the card sleeve 41 and then spreads this card sleeve 41 into a plane to place it on the playfield 7. Alternatively, it is also possible to adopt the following method in the present invention. That is, means may be adopted that places groups of cards 6 making up respective units as they are in corresponding preset predetermined areas on the playfield 7 with the individual cards 6 being oriented as desired without being on top of one another and reads the code patterns recorded on the bottom sides of the cards 6 with the image sensor 40. If such means is adopted, a group of cards 6 making up a single unit is placed in each of the predetermined areas set on the playfield 7. This makes it possible to read the specific information recorded in the cards 6 on a unit-by-unit basis by program processing, so that it is possible to create the above-described unit data table.

Further, in the above-described embodiment of the present invention, a description is given of the case of using a card as a play item for playing a game. The present invention may also be applied to a game using a play item that has a sticker or the like with code information printed thereon stuck to the bottom side of a stand with a figure such as a doll and causes the game to proceed. In a game using such a figure, a unit that pays out this figure is provided in place of the card payout unit 10 shown in FIG. 2.

Further, in the above-described embodiment of the present invention, in addition to the above-described code pattern read with infrared light, two-dimensional codes such as a barcode and a QR code (registered trademark) and magnetically recorded information may be adopted as the specific information for identifying individual play items.

Further, needless to say, in the above-described embodiment of the present invention, storage media other than the cards 6 (such as memory chips downsized to stamp size) may be used, or it is applicable to a cardless system that makes it possible to specify preset units gradually in accordance with a player's rank (rank in a game) on the condition of the player's authentication.

The present international application claims priority based on Japanese Patent Application No. 2006-124514, filed on Apr. 27, 2006, the entire contents of which are hereby incorporated by reference.

The invention claimed is:

1. A method of controlling a game apparatus for executing a game, comprising:
   storing, by a computer processor, a first cost value set for a player, the first cost value being a total cost value usable by the player;
   storing, by the computer processor, a second cost value of a certain amount separately from the first cost value, the second cost value being a reserve cost value for the player;
   subtracting, by the computer processor, a third cost value preset for an item usable by the player from the second cost value of the player in response to elimination of the item if the second cost value is more than zero, and continuously subtracting, by the computer processor, the third cost value from the first cost value of the player in response to the second cost value of the player becoming zero if the third cost value is greater than the second cost value of the player;
   determining, by the computer processor, whether the second cost value is more than zero after the elimination of the item;
   comparing, by the computer processor, a remaining amount of the second cost value and the third cost value set for the eliminated item in response to determining that the second cost value is more than zero after the elimination of the item;
   computing, by the computer processor, a penalty coefficient based on a result of the comparison;
   discounting, by the computer processor, a hit point of the eliminated item using the penalty coefficient, and causing, by the computer processor, the eliminated item having the discounted hit point to re-enter the game; and
   determining, by the computer processor, that the game is over if the first cost value of the player becomes zero before a time for the game elapses,
   wherein the item is eliminated when the hit point becomes zero.

2. The method as claimed in claim 1, further comprising:
   computing, by the computer processor, a number of items used by the player other than the eliminated item in causing the eliminated item to re-enter after passage of a predetermined time;
   determining, by the computer processor, a re-enter coefficient numerical value based on the number of items; and
   causing, by the computer processor, the eliminated item to re-enter after passage of a time determined from the re-enter coefficient numerical value.

3. The method as claimed in claim 1, further comprising:
   changing, by the computer processor, a numerical value of the third cost value set for the item to be caused to re-enter and a preset time required before re-entering after the elimination in causing the eliminated item to re-enter after passage of a predetermined time.

4. A non-transitory storage medium containing a program for causing a computer processor to execute a method of controlling a game apparatus for executing a game, the method comprising:
   storing a first cost value set for a player, the first cost value being a total cost value usable by the player;
   storing a second cost value of a certain amount separately from the first cost value, the second cost value being a reserve cost value for the player;

subtracting a third cost value preset for an item usable by the player from the second cost value of the player in response to elimination of the item if the second cost value is more than zero, and continuously subtracting the third cost value from the first cost value of the player in response to the second cost value of the player becoming zero if the third cost value is greater than the second cost value of the player;

determining whether the second cost value is more than zero after the elimination of the item;

comparing a remaining amount of the second cost value and the third cost value set for the eliminated item in response to determining that the second cost value is more than zero after the elimination of the item;

computing a penalty coefficient based on a result of the comparison;

discounting a hit point of the eliminated item using the penalty coefficient, and causing the eliminated item having the discounted hit point to re-enter the game; and determining that the game is over if the first cost value of the player becomes zero before a time for the game elapses, wherein the item is eliminated when the hit point becomes zero.

5. A game apparatus for executing a game, comprising:

a computer processor configured to execute a program stored in a storage part to perform storing a first cost value set for a player, the first cost value being a total cost value usable by the player;

storing a second cost value of a certain amount separately from the first cost value, the second cost value being a reserve cost value for the player;

subtracting a third cost value preset for an item usable by the player from the second cost value of the player in response to elimination of the item if the second cost value is more than zero, and continuously subtracting the third cost value from the first cost value of the player in response to the second cost value of the player becoming zero if the third cost value is greater than the second cost value of the player;

determining whether the second cost value is more than zero after the elimination of the item;

comparing a remaining amount of the second cost value and the third cost value set for the eliminated item in response to determining that the second cost value is more than zero after the elimination of the item;

computing a penalty coefficient based on a result of the comparison;

discounting a hit point of the eliminated item using the penalty coefficient, and causing the eliminated item having the discounted hit point to re-enter the game; and determining that the game is over if the first cost value of the player becomes zero before a time for the game elapses, wherein the item is eliminated when the hit point becomes zero.

6. The method as claimed in claim 1, further comprising:

obtaining, by the computer processor, electronic information of the item; and determining, by the computer processor, the third cost value based on the obtained electronic information of the item.

7. The method as claimed in claim 1, further comprising:

obtaining, by the computer processor, electronic information of the item;

detecting, by the computer processor, a position of the item based on the obtained electronic information of the item; and displaying, by a graphic display circuit, the item on a display based on the detected position of the time.

8. The non-transitory storage medium as claimed in claim 4, wherein the method further comprises:

obtaining electronic information of the item; and determining the third cost value based on the obtained electronic information of the item.

9. The non-transitory storage medium as claimed in claim 4, wherein the method further comprises:

obtaining electronic information of the item;

detecting a position of the item based on the obtained electronic information of the item; and displaying the item on a display based on the detected position of the time.

10. The game apparatus as claimed in claim 5, wherein the computer processor is configured to execute the program stored in the storage part to further perform obtaining electronic information of the item; and determining the third cost value based on the obtained electronic information of the item.

11. The game apparatus as claimed in claim 5, wherein the computer processor is configured to execute the program stored in the storage part to further perform obtaining electronic information of the item;

detecting a position of the item based on the obtained electronic information of the item; and displaying the item on a display based on the detected position of the time.

* * * * *